United States Patent
Moteki et al.

(10) Patent No.: US 10,147,192 B2
(45) Date of Patent: Dec. 4, 2018

(54) COORDINATE-CONVERSION-PARAMETER DETERMINATION APPARATUS, COORDINATE-CONVERSION-PARAMETER DETERMINATION METHOD, AND NON-TRANSITORY COMPUTER READABLE RECORDING MEDIUM HAVING THEREIN PROGRAM FOR COORDINATE-CONVERSION-PARAMETER DETERMINATION

(71) Applicant: FUJITSU LIMITED, Kawasaki-shi, Kanagawa (JP)

(72) Inventors: Atsunori Moteki, Kawasaki (JP); Nobuyasu Yamaguchi, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 222 days.

(21) Appl. No.: 15/053,670

(22) Filed: Feb. 25, 2016

(65) Prior Publication Data

US 2016/0267661 A1 Sep. 15, 2016

(30) Foreign Application Priority Data

Mar. 10, 2015 (JP) ................................ 2015-047453

(51) Int. Cl.
*G06T 7/73* (2017.01)
*G06T 7/00* (2017.01)
(Continued)

(52) U.S. Cl.
CPC ............ *G06T 7/0044* (2013.01); *G06T 7/593* (2017.01); *G06T 7/73* (2017.01); *G06T 19/006* (2013.01);
(Continued)

(58) Field of Classification Search
CPC . G06T 2207/30244; G06T 2207/30204; G06T 2207/10012; G06T 7/70;
(Continued)

(56) References Cited

U.S. PATENT DOCUMENTS

2003/0076996 A1* 4/2003 Neumann .............. G03B 15/00
                                                           382/202
2007/0008312 A1* 1/2007 Zhou ....................... G06T 7/80
                                                           345/419
(Continued)

FOREIGN PATENT DOCUMENTS

JP    2005-31044     2/2005
JP    2013-127783    6/2013
(Continued)

OTHER PUBLICATIONS

Sturm, Peter, and Long Quan. "Affine stereo calibration." In International Conference on Computer Analysis of Images and Patterns, pp. 838-843. Springer, Berlin, Heidelberg, 1995.*

(Continued)

*Primary Examiner* — Carol Wang
(74) *Attorney, Agent, or Firm* — Staas & Halsey LLP

(57) ABSTRACT

A coordinate-conversion-parameter determination apparatus includes a marker detector that detects feature points of a marker from each of a first and second images; a three-dimensional position determiner that calculates three-dimensional coordinates of each of the feature points of the marker in a camera coordinate system in which reference is a first place, based on positions of the feature points in the first and second images; and a coordinate-conversion-parameter determiner that calculates a coordinate conversion parameter so that a sum of absolute values of errors between three-dimensional coordinates in a world coordinate system, the three-dimensional coordinates in the world coordinate system being obtained by converting the three-dimensional (Continued)

coordinates of the feature points of the marker in the camera coordinate system by using the coordinate conversion parameter, and three-dimensional coordinates of feature points in the world coordinate system that correspond to the feature points of the marker in real space is minimized.

8 Claims, 14 Drawing Sheets

(51) Int. Cl.
    *G06T 19/00*    (2011.01)
    *G06T 7/593*    (2017.01)

(52) U.S. Cl.
    CPC ............. *G06T 2207/30204* (2013.01); *G06T 2207/30244* (2013.01)

(58) Field of Classification Search
    CPC .......... G06T 7/246; G06T 7/593; G06T 7/73; G06T 7/80; G06T 7/97; G06T 7/337; G06T 7/35; G06T 7/38; G06T 7/596; G06T 7/30; G06T 2200/08; G06T 2200/04; G06T 2219/2004; G06T 19/006; G06T 7/33; G06T 7/85; G06T 7/344; G06T 3/20; G06T 3/60
    See application file for complete search history.

(56) References Cited

U.S. PATENT DOCUMENTS

| | | | | |
|---|---|---|---|---|
| 2008/0285854 A1* | 11/2008 | Kotake | ...................... | G06T 7/73 382/190 |
| 2008/0298673 A1* | 12/2008 | Zhang | ..................... | G06K 9/209 382/154 |
| 2009/0296980 A1* | 12/2009 | Yi | ............................. | G06K 9/20 382/100 |
| 2010/0020178 A1* | 1/2010 | Kleihorst | ................... | G06T 7/85 348/175 |
| 2010/0045701 A1* | 2/2010 | Scott | ........................ | G01S 5/163 345/633 |
| 2012/0162414 A1* | 6/2012 | Zhang | ..................... | G01C 25/00 348/139 |
| 2012/0293667 A1* | 11/2012 | Baba | .................. | H04N 13/0246 348/187 |
| 2013/0038694 A1* | 2/2013 | Nichani | ...................... | G06T 7/20 348/46 |
| 2013/0148851 A1 | 6/2013 | Leung et al. | | |
| 2013/0225994 A1* | 8/2013 | Hsu | .......................... | A61B 8/08 600/439 |
| 2014/0267254 A1* | 9/2014 | Sievert | ..................... | G06T 17/05 345/420 |
| 2015/0109420 A1* | 4/2015 | Masuda | ............... | G01B 11/245 348/47 |
| 2015/0269723 A1* | 9/2015 | Karam | .................. | G06T 7/0004 348/46 |
| 2015/0288951 A1* | 10/2015 | Mallet | .................. | H04N 17/002 348/46 |

FOREIGN PATENT DOCUMENTS

| | | |
|---|---|---|
| JP | 2014-71035 | 4/2014 |
| JP | 2014-92984 | 5/2014 |

OTHER PUBLICATIONS lhrke, Ivo. "Digital elevation mapping using stereoscopic vision." RoyalInstitute of Technology (2001).*
Tseng, Hung-Yu, Po-Chen Wu, Ming-Hsuan Yang, and Shao-Yi Chien. "Direct 3D pose estimation of a planar target." In Applications of Computer Vision (WACV), 2016 IEEE Winter Conference on, pp. 1-9. IEEE, 2016.*
Baratoff, Gregory, Alexander Neubeck, and Holger Regenbrecht. "Interactive multi-marker calibration for augmented reality applications." In Proceedings of the 1st International Symposium on Mixed and Augmented Reality, p. 107. IEEE Computer Society, 2002.*
Maidi, Madjid, Jean-Yves Didier, Fakhreddine Ababsa, and Malik Mallem. "A performance study for camera pose estimation using visual marker based tracking." Machine Vision and Applications 21, No. 3 (2010): 365-376.*
Ababsa, Fakhr-eddine, and Malik Mallem. "Robust camera pose estimation using 2d fiducials tracking for real-time augmented reality systems." In Proceedings of the 2004 ACM SIGGRAPH international conference on Virtual Reality continuum and its applications in industry, pp. 431-435. ACM, 2004.*
Extended European Search Report dated Sep. 8, 2016 in corresponding European Application No. 16157310.0.
Andre Gaschler, "Real-Time Marker-Based Motion Tracking: Application to Kinematic Model Estimation of a Humanoid Robot", Master's Thesis in Informatik, Feb. 15, 2011, pp. 1-97.
Kato et al., "An Augmented Reality System and its Calibration based on Marker Tracking", Journal of the Virtual Reality Society of Japan vol. 4 No. 4, Dec. 1999.
Yamada et al., "Latest Algorithm of 3-D, Reconstruction from Two Images", A Technical Report from Information Processing Society, vol. 2009-CVIM-168-15, 2009.
Rosten et al., "Machine Learning for High-Speed Corner Detection", Proc European Conference on Computer Vision, vol. 1, 2006, pp. 430-443.
Lucas et al., "An Iterative Image Registration Technique with an Application to Stereo Vision", Imaging Understanding Workshop, 1981, pp. 121-130.
Hartley, "In Defense of the Eight-Point Algorithm", IEEE Transaction on Pattern Analysis and Machine Intelligence, vol. 19, No. 6, Jun. 1997, pp. 580-593.
Zhang, "A Flexible New Technique for Camera Calibration", IEEE Transactions on Pattern Analysis and Machine Intelligence, vol. 22, No. 11, Nov. 2000, pp. 1330-1334.
Klein et al., "Parallel Tracking and Mapping for Small AR Workspaces", Proceeding ISMAR '07 Proceedings of the 2007 6th IEEE and ACM International Symposium on Mixed and Augmented Reality, 2007, pp. 1-10.
Kato el al., "Marker Tracking and HMD Calibration for a Video-Based Augmented Reality Conferencing System", Proceedings of 2nd International Workshop on Augmented Reality, 1999, pp. 85-94.

* cited by examiner

FIG. 5

| NUMBER | COORDINATES IN FIRST IMAGE | COORDINATES IN SECOND IMAGE | TYPE FLAG |
|---|---|---|---|
| 1 | (265.3, 397.6) | (295.1, 427.9) | f |
| 2 | (412.9, 366.1) | (442.3, 398.2) | f |
| 3 | (208.8, 211.3) | (237.9, 240.4) | f |
| ... | ... | ... | ... |
| 329 | (92.1, 68.1) | (125.4, 99.8) | m |
| 330 | (142.7, 70.7) | (174.0, 101.8) | m |
| 331 | (140.9, 118.6) | (174.0, 101.8) | m |
| 332 | (91.8, 120.2) | (122.3, 151.5) | m |

FIG. 6

| NUMBER OF NATURAL FEATURE POINT | COORDINATES IN FIRST IMAGE | COORDINATES IN SUBSEQUENT IMAGE | TRACKING FLAG |
|---|---|---|---|
| 1 | (265.3, 397.6) | (295.1, 427.9) | True |
| 2 | (412.9, 366.1) | (442.3, 398.2) | True |
| 3 | (208.8, 211.3) | — | False |
| ... | ... | ... | ... |

FIG. 7
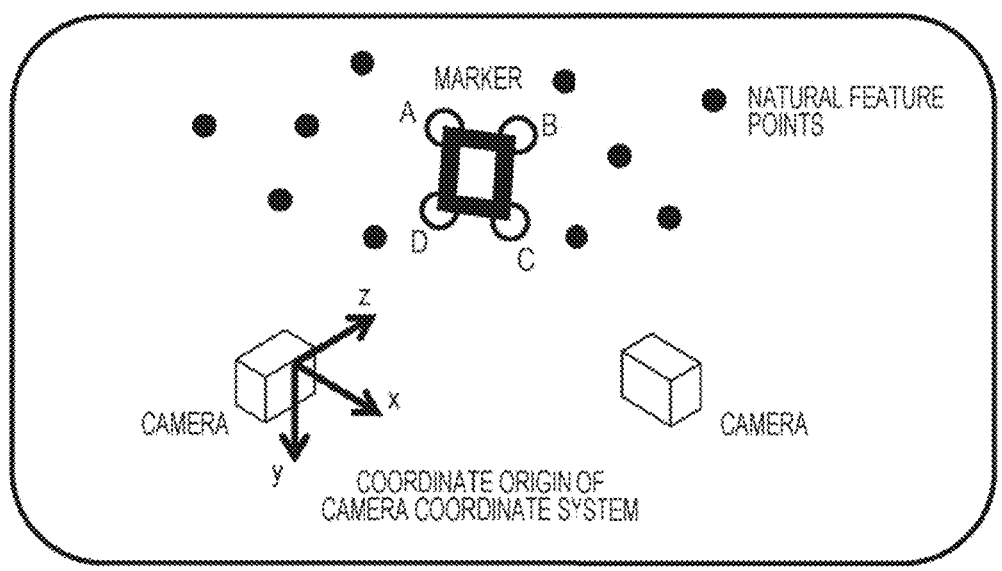
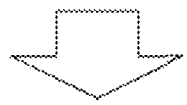
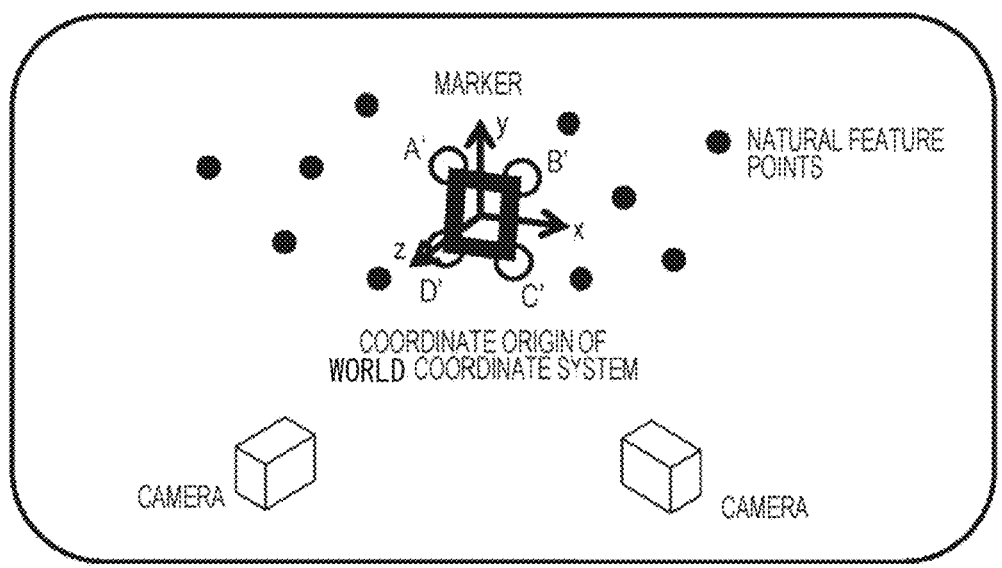

FIG. 8

| NUMBER | X [mm] | Y [mm] | Z [mm] | TYPE FLAG |
|---|---|---|---|---|
| 1 | 126 | 59 | 329 | f |
| 2 | 314 | 193 | 289 | f |
| 3 | 212 | 59 | 339 | f |
| ... | ... | ... | ... | ... |
| 329 | 43 | 39 | 10 | m |
| 330 | 82 | 101 | 22 | m |
| 331 | 139 | 154 | 13 | m |
| 332 | 189 | 76 | 29 | m |

COORDINATE-CONVERSION-PARAMETER DETERMINATION APPARATUS, COORDINATE-CONVERSION-PARAMETER DETERMINATION METHOD, AND NON-TRANSITORY COMPUTER READABLE RECORDING MEDIUM HAVING THEREIN PROGRAM FOR COORDINATE-CONVERSION-PARAMETER DETERMINATION

CROSS-REFERENCE TO RELATED APPLICATION

This application is based upon and claims the benefit of priority of the prior Japanese Patent Application No. 2015-047453, filed on Mar. 10, 2015, the entire contents of which are incorporated herein by reference.

FIELD

The embodiments discussed herein are related to a coordinate-conversion-parameter determination apparatus for calculating parameters for coordinate conversion between a camera coordinate system and a world coordinate system, a coordinate-conversion-parameter determination method, and a non-transitory computer readable recording medium having therein program for coordinate-conversion-parameter determination.

BACKGROUND

In recent years, study has been carried out on the so-called augmented reality (AR) by which various types of information are displayed superimposed on an image captured by a camera, in order to aid user work.

In a system that realizes augmented reality, it is important that virtual space be accurately aligned with real space in order to superimpose information on an appropriate position in an image captured by a camera. To this end, there has been proposed a technology for estimating the position and the orientation of a camera based on the position and the shape of a pre-placed known marker in an image (for example, see Kato et al., "An Augmented Reality System and its Calibration based on Marker Tracking", Journal of the Virtual Reality Society of Japan, 4(4), pp. 607-616, December, 1999). Also, there has been proposed a technology in which two images showing a subject are captured from arbitrary two places, feature points are extracted from each of the images, and the three-dimensional coordinates of the corresponding feature points in the images are calculated using the principle of triangulation based on the coordinates of the feature points in each image (for example, see Yamada, et al., "Latest Algorithm of 3-D Reconstruction from Two Views", a technical report from Information Processing Society, vol. 2009-CVIM-168-15, pp. 1-8, 2009).

However, there are cases in which it is difficult to accurately detect the marker in an image, depending on photography conditions. There are also cases in which the marker goes out of the photography range of the camera, and consequently, the marker is not shown in an image. In such cases, it is difficult to estimate the orientation of the camera based on the marker. Accordingly, there has been proposed a technology in which when an estimation result of a camera pose representing the position and rotation of a camera in a world coordinate system of the camera is not obtained using a marker, the camera pose is estimated using a known point whose three-dimensional coordinates are known in the world coordinate system (for example, see Japanese Laid-open Patent Publication No. 2014-92984).

SUMMARY

According to an aspect of the invention, a coordinate-conversion-parameter determination apparatus includes an image capture unit that generates a first image by photographing, at a first place, a marker that is placed in advance and whose position and shape are known and a second image by photographing, at a second place different from the first place, the marker; a marker detector that detects feature points of the marker from each of the first image and the second image; a three-dimensional position determiner that calculates three-dimensional coordinates of each of the feature points of the marker in a camera coordinate system in which reference is the first place, based on a position of the feature point in the first image and a position of the feature point in the second image; and a coordinate-conversion-parameter determiner that calculates a coordinate conversion parameter so that a sum of absolute values of errors between three-dimensional coordinates in a world coordinate system, the three-dimensional coordinates in the world coordinate system being obtained by converting the three-dimensional coordinates of the feature points of the marker in the camera coordinate system by using the coordinate conversion parameter, and three-dimensional coordinates of feature points in the world coordinate system that correspond to the feature points of the marker in real space is minimized.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a corresponding-point information table;

FIG. 6 illustrates an example of a natural-feature-point information table;

FIG. 7 illustrates an overview of coordinate conversion;

FIG. 8 is a table illustrating an example of an initial map;

DESCRIPTION OF EMBODIMENTS

When a marker having a known shape goes out of the photography range of a camera that generates an image, it is difficult for the camera to estimate the position and the orientation of the camera based on the marker. Thus, in order to estimate the position and the orientation of the camera, the camera uses, for example, natural feature points other than the marker. In this case, based on coordinate conversion parameters, the camera converts the three-dimensional coordinates of the natural feature points in a camera coordinate system into three-dimensional coordinates in a world coordinate system. Based on the converted three-dimensional coordinates of the natural feature points in the world coordinate system, the camera estimates the position and the orientation of the camera. In this case, when error occurs in the three-dimensional coordinates of the natural feature points in the camera coordinate system, error also occurs in the estimated position and orientation of the camera.

Accordingly, it is desired to provide a coordinate-conversion-parameter determination apparatus that may enhance the coordinate conversion accuracy during conversion of the three-dimensional coordinates of feature points between the camera coordinate system and the world coordinate system.

A coordinate-conversion-parameter determination apparatus will be described below with reference to the accompanying drawings. This coordinate-conversion-para meter determination apparatus detects a plurality of feature points of a marker from each of two images generated at different photography positions by an image capture unit. The coordinate-conversion-parameter determination apparatus determines the three-dimensional coordinates in a camera coordinate system for each of the feature points of the marker, based on a position in each image. The coordinate-conversion-parameter determination apparatus calculates coordinate conversion parameters so that the sum of the absolute values of errors between three-dimensional coordinates in a world coordinate system, the three-dimensional coordinates being obtained by converting the three-dimensional coordinates of the feature points of the marker in the camera coordinate system by using the coordinate conversion parameters, and the three-dimensional coordinates of corresponding feature points in real space is minimized. In accordance with the coordinate conversion parameters, the coordinate-conversion-parameter determination apparatus converts the determined three-dimensional coordinates in the camera coordinate system for the feature points other than the marker into three-dimensional coordinates in the world coordinate system. The coordinate-conversion-parameter determination apparatus then stores, in a storage unit as an initial map, the converted three-dimensional coordinates in the world coordinate system for the feature points other than the marker.

Figure 1:
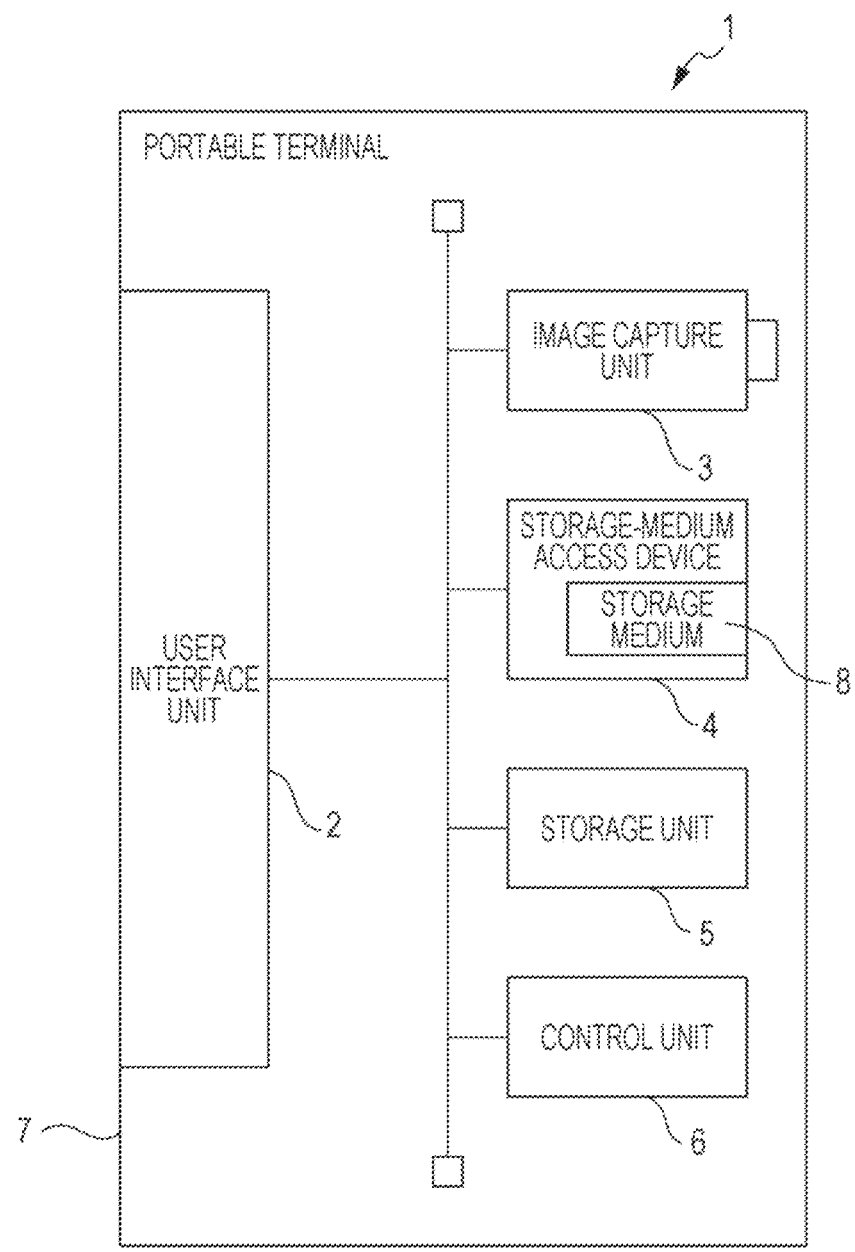
FIG. 1 is a block diagram of the hardware of a portable terminal according to one embodiment of a coordinate-conversion-parameter determination apparatus.

FIG. 1 is a block diagram of the hardware of a portable terminal according to one embodiment of a coordinate-conversion-parameter determination apparatus. A portable terminal 1 includes a user interface unit 2, an image capture unit 3, a storage-medium access device 4, a storage unit 5, and a control unit 6. The user interface unit 2, the image capture unit 3, the storage-medium access device 4, the storage unit 5, and the control unit 6 are provided in a housing 7. The portable terminal 1 is, for example, a mobile phone, a portable information terminal, or a tablet computer. The portable terminal 1 may further include a communication interface circuit (not illustrated) for connecting the portable terminal 1 to other equipment. It is to be noted that FIG. 1 is a diagram for describing constituent elements of the portable terminal 1 and is not a diagram representing actual arrangements of the constituent elements of the portable terminal 1.

The image capture unit 3 photographs its surroundings to acquire an image at each predetermined photography cycle, and based on a marker or natural feature points shown in the image, the portable terminal 1 estimates the position and the orientation of the image capture unit 3. The portable terminal 1 may present augmented reality to a user by superimposing a variety of information on the image through use of estimation results of the position and the orientation.

The user interface unit 2 includes, for example, a liquid-crystal display or an organic electroluminescent display and is arranged so that a display screen of the user interface unit 2 faces a user who is directly opposite the front surface of the housing 7. The user interface unit 2 displays a variety of information, such as an image generated by the image capture unit 3, to the user. The user interface unit 2 may include a touch panel display. In such a case, in accordance with a control signal from the control unit 6, the user interface unit 2 displays, for example, various icons or operation buttons (for example, an initial-map generation start button or an initial-map generation instruction button). When the user touches the position of any of the display icons or operation buttons, the user interface unit 2 generates an operation signal corresponding to the position and outputs the operation signal to the control unit 6.

The image capture unit 3 includes, for example, an image sensor and an image-capture optical system. The image sensor includes solid-state image capture elements arranged in a two-dimensional array, and the image-capture optical system forms an image of a subject on the image sensor.

By photographing surroundings of the portable terminal 1 at each predetermined photography cycle, the image capture unit 3 generates an image for each photography cycle. Each time an operation, such as the user pressing a button, is performed, the image capture unit 3 also generates an image. The image that is generated may be a color image represented by an RGB color system or may be a grayscale image. Each time the image capture unit 3 generates an image, it outputs the generated image to the control unit 6. The photography cycle is, for example, 33 ms.

The storage-medium access device 4 is, for example, a device for accessing a storage medium 8, such as a semiconductor memory card. The storage-medium access device 4 reads, for example, a computer program that is stored in the storage medium 8 and that is to be executed by the control unit 6, and passes the read computer program to the control unit 6. When the control unit 6 executes a computer program that realizes a function serving as the coordinateconversion-parameter determination apparatus, the storage-medium access device 4 may read, from the storage medium 8, a computer program for determining coordinate conversion parameters and then pass the read computer program to the control unit 6.

The storage unit 5 includes, for example, a readable/writable nonvolatile semiconductor memory and a readable/writable volatile semiconductor memory. The storage unit 5 stores therein various types of data and various application programs executed by the control unit 6. The storage unit 5 further stores various types of data used for coordinate-conversion-parameter determination processing. For example, the storage unit 5 stores therein information indicating the position and the orientation of the image capture unit 3 which are estimated based on an image acquired in a most-recent certain period of time (for example, a period corresponding to a few frames to several tens of frames).

The storage unit 5 further stores therein an initial map containing the three-dimensional coordinates of a marker and the three-dimensional coordinates of respective natural feature points, the three-dimensional coordinates being included in a three-dimensional world coordinate system set in real space.

Figure 2:
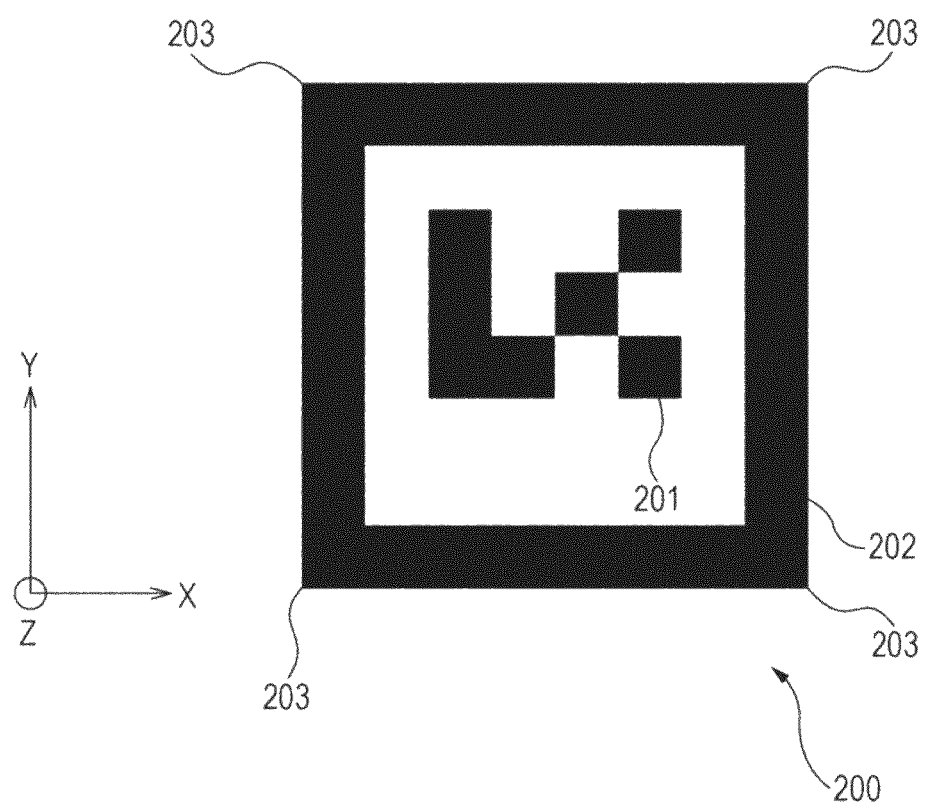
FIG. 2 is view of an example of the marker.

FIG. 2 is a figure of an example of the marker. A marker 200 includes an identification pattern 201 and a square pattern 202, which surrounds the identification pattern 201. The identification pattern 201 may be, for example, any pattern that may be easily distinguished from a texture in the surroundings of the place where the marker 200 is placed. In the present embodiment, in order to determine coordinate conversion parameters, the positions of four corners 203 at the periphery of the square pattern 202 are detected in the image as feature points. The marker is not limited to the marker 200 illustrated in FIG. 2 and may be anything that may be easily distinguished from a texture in the surroundings of the place where the marker is placed. For example, the periphery of the marker may have a triangular shape, a rectangular shape, or a pentagonal shape. Other positions on the marker may also be detected for determining the coordinate conversion parameters.

In the present embodiment, the world coordinate system set in the real space is assumed to have its origin at the center of the marker, for the sake of simplicity. An X-axis and a Y-axis are set on a plane including the marker, and a Z-axis is set for a normal to the plane including the marker.

The control unit 6 includes one or more processors and its peripheral circuit. The control unit 6 is connected to the individual elements in the portable terminal 1 through signal lines and controls the entire portable terminal 1.

Each time the control unit 6 receives an image from the image capture unit 3, the control unit 6 estimates the position and the orientation of the image capture unit 3, based on the marker or natural feature points shown in the image.

Processing for estimating the position and the orientation of the image capture unit 3 based on natural feature points will hereinafter be referred to as "natural-feature-point-based orientation estimation processing".

Figure 3:
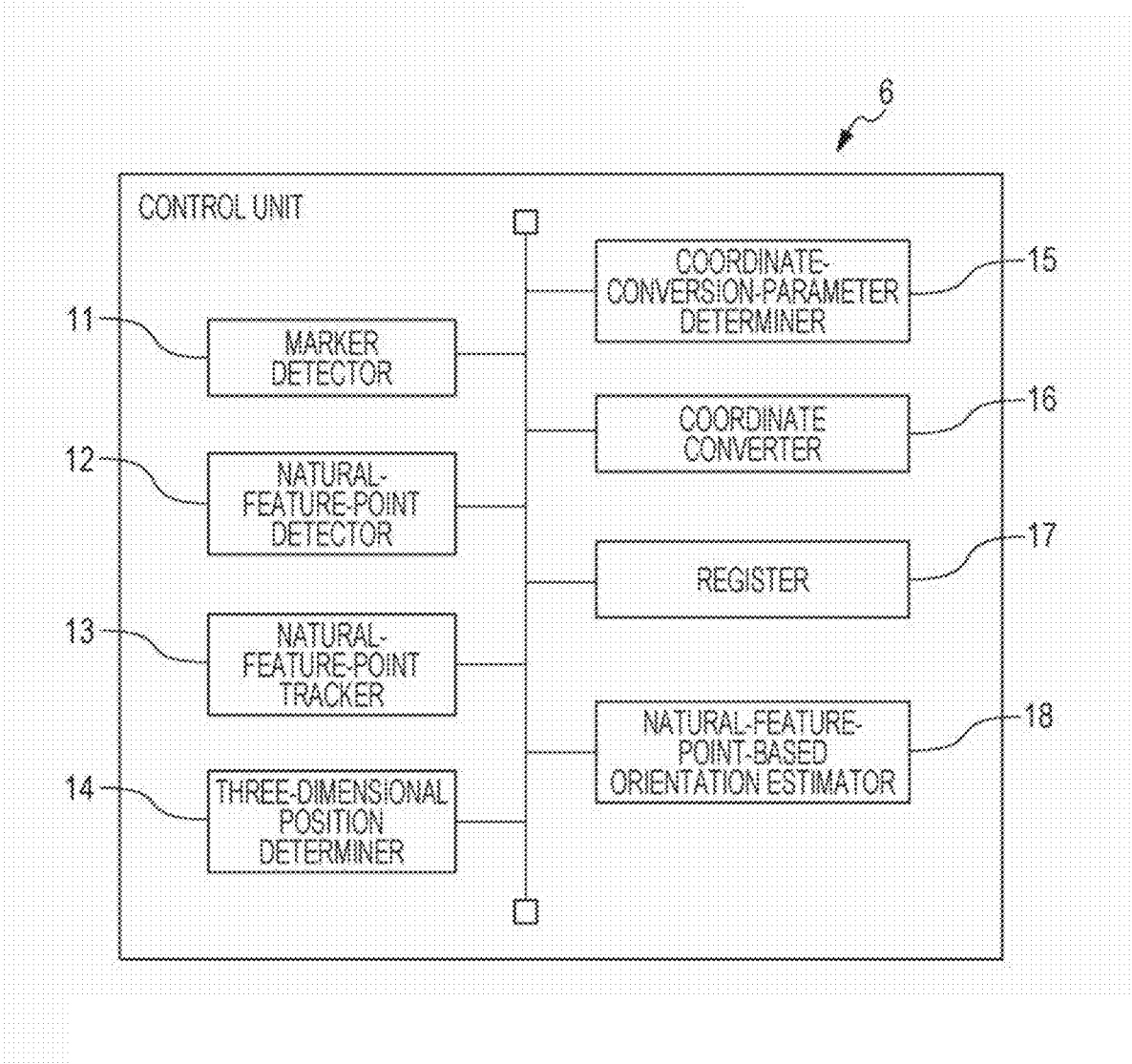
FIG. 3 is a functional block diagram of a control unit related to estimation of the position and the orientation of an image capture unit.

FIG. 3 is a functional block diagram of the control unit 6 related to estimation of the position and the orientation of the image capture unit 3. The control unit 6 includes a marker detector 11, a natural-feature-point detector 12, a natural-feature-point tracker 13, a three-dimensional position determiner 14, a coordinate-conversion-parameter determiner 15, a coordinate converter 16, a register 17, and a natural-feature-point-based orientation estimator 18. These elements included in the control unit 6 are realized by, for example, a computer program executed by the control unit 6. The elements included in the control unit 6 may be incorporated into the portable terminal 1 as an integrated circuit for realizing the functions of the elements, independently from the processor(s) in the control unit 6.

The marker detector 11 detects a plurality of feature points of a marker from two images acquired by photographing the marker at mutually different positions. In the present embodiment, the marker detector 11 detects, as feature points, the coordinates of four corners of a marker from each of a first image and a second image. Since the marker includes a known pattern that may be easily distinguished from a texture in the surroundings of the place where the marker is placed, the marker detector 11 may accurately detect the position of the marker in images. Generation of the initial map is started when the user presses a button (for example, the initial-map generation start button) for the first time, and an instruction for generating an initial map is issued when the user presses the button for the second time, in order to determine coordinate conversion parameters based on two images generated by photographing the marker from different positions. Thus, when the user performs an operation, such as pressing the button (for example, the initial-map generation instruction button) for the second time, the marker detector 11 detects the coordinates of a plurality of feature points of the marker from each of the two images showing the marker, the two images being acquired by the image capture unit 3. The marker detector 11 associates the detected feature points of the marker in one of the images and the detected feature points of the marker in the other image. For example, the feature points of the marker are four corners of the marker. Alternatively, the feature points of the marker may be other feature points of the marker. Hereinafter, the position of the image capture unit 3 when the user performs an operation, such as pressing the button (for example, the initial-map generation start button) for the first time, is referred to as a "first place". Also, the position of the image capture unit 3 when the user performs an operation, such as pressing the button (for example, the initial-map generation instruction button) for the second time, is referred to as a "second place".

Figure 4:
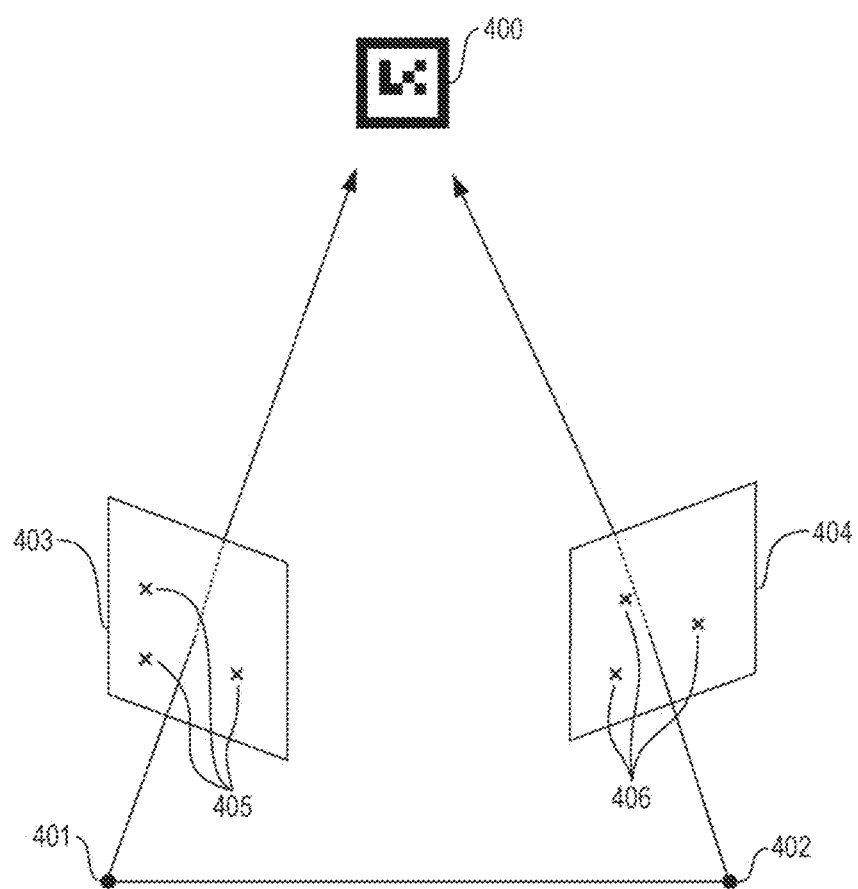
FIG. 4 is a diagram illustrating an example of a positional relationship between a first place and a second place.

FIG. 4 is a diagram illustrating an example of a positional relationship between a first place 401 and a second place 402. In the present embodiment, the portable terminal 1 displays a virtual image on a predetermined position in a superimposed manner through augmented reality. To this end, at the first place 401, the user performs an operation, such as pressing the initial-map generation start button, on the portable terminal 1, with a marker 400 being designated as a photography range. Upon the operation, at the first place 401, the image capture unit 3 generates an image 403 showing the marker 400. An image generated at the first place is hereinafter referred to as a "first image". Also, at the second place 402 away from the first place 401, the user performs an operation, such as pressing the initial-map generation instruction button, on the portable terminal 1, with the marker 400 being designated as a photography range. Upon the operation, at the second place, the image capture unit 3 generates an image 404 showing the marker 400. An image generated at the second place is hereinafter referred to as a "second image". The marker detector 11 detects a marker in an image, for example, by performing template matching on the image through use of a plurality of templates indicating marker patterns viewed from various directions.

In order to speed up the marker detection processing, the marker detector 11 may binarize each of the pixels in the image, based on whether or not the luminance value of the pixel is larger than or equal to a predetermined threshold. For example, since the square pattern 202 of the marker 200 illustrated in FIG. 2 and the identification pattern 201 in the square pattern 202 have darker color than the surroundings thereof, the luminance values of the pixels in the image which correspond to the square pattern 202 and the identification pattern 201 also have smaller luminance values than those of the pixels in the surroundings. Thus, in the binarized image, the pixels corresponding to the pattern included in the marker 200 and the other pixels have different pixel values. For example, the marker detector 11 increases the luminance values of pixels in a binarized image, the luminance values corresponding to pixels having luminance values larger than or equal to a predetermined threshold, to relatively larger values and reduces the luminance values of pixels in the binarize image, the luminance values corresponding to pixels having luminance values smaller than the predetermined threshold, to relatively small values. As a result, pixels corresponding to the pattern included in the marker have relatively small luminance values. Pixels having relatively small luminance values in a binarized image are hereinafter referred to as "black pixels", for the sake of convenience.

By executing labeling processing on a collection of black pixels, the marker detector 11 determines one or more black pixel areas where the black pixels are coupled to each other. The marker detector 11 then performs contour-line tracking on each black pixel area to determine the contour line of the black pixel area. In addition, the marker detector 11 performs broken-line approximation on each contour line and sets, as a marker candidate area, a black pixel area in which contour lines are approximated with four line segments. The marker detector 11 performs template matching between each marker candidate area and a template and calculates, for example, a normalized value of cross-correlation between the marker candidate area and the template in accordance with:

$$R = \frac{\sum_{j=0}^{N-1} \sum_{i=0}^{M-1} \{(I(i,j) - I_{av})(T(i,j) - T_{av})\}}{\sqrt{\{\sum_{j=0}^{N-1} \sum_{i=0}^{M-1} (I(i,j) - I_{av})^2\}\{\sum_{j=0}^{N-1} \sum_{i=0}^{M-1} (T(i,j) - T_{av})^2\}}} \quad (1)$$

where T(i, j) represents a luminance value of pixel (i, j) in the template, I(i, j) represents a luminance value of pixel (i, j) in a marker candidate area, Tav represents an average luminance value in the template, and Jay represents an average luminance value in the marker candidate area.

When the largest value of the normalized cross-correlation values is greater than or equal to a marker detection threshold (for example, 0.8), the marker detector 11 determines that a marker is shown in the marker candidate area corresponding to the largest value of the normalized cross-correlation values. The marker detector 11 then designates the coordinates of four corners of the marker candidate area as the coordinates of the marker in the image.

On the other hand, when the maximum value of the normalized cross-correlation values is smaller than the marker detection threshold, the marker detector 11 determines that no marker is shown in the marker candidate area.

Each time the marker detector 11 determines the coordinates of the four corners of the marker in an image, it stores the determined coordinates in a corresponding-point information table in the storage unit 5 so that the order of acquiring corresponding images may be understood.

FIG. 5 illustrates an example of a corresponding-point information table 500. Coordinates in a first image, coordinates in a second image, and a type flag indicating whether a feature point in question is a feature point on a marker or a natural feature point are stored in each row in the corresponding-point information table 500. In the type flag, m indicates a marker, and f indicates a natural feature point. In this example, for instance, the coordinates of natural feature points in the first image and so on are stored in the first to 328th rows. Details of the natural feature points are described later. Also, for instance, the coordinates of feature points of a marker in the first image, the coordinates of feature points of a marker in the second image which correspond to the feature points of the marker in the first image, and so on are stored in the 329th to 332nd rows.

Each time an image is obtained from the image capture unit 3 at each predetermined photography cycle while the control unit 6 executes the natural-feature-point-based orientation estimation processing, the natural-feature-point detector 12 detects natural feature points from the image. Also, when the user performs an operation, such as pressing the initial-map generation start button, the natural-feature-point detector 12 detects natural feature points from the first image.

First, a description will be given of processing in which the natural-feature-point detector 12 detects natural feature points. The natural-feature-point detector 12 performs natural-feature-point corner detection processing, for example, involving Features from Accelerated Segment Test (FAST), on pixels in an image and calculates a feature descriptor representing a natural feature point for each pixel to thereby detect the natural feature point. The natural-feature-point detector 12 then passes the detected natural feature point to the natural-feature-point tracker 13. For the natural-feature-point corner detection involving FAST, a reference is made to, for example, Edward Rosten and Tom Drummond, "Machine learning for high-speed corner detection", in Proc. European Conference on Computer Vision, vol. 1, pp. 430-443, 2006. The feature-point detection method is not limited to a method using FAST and may be any method for detecting corners as feature points. Examples of such a method include the Harris feature detection method and the method called "Good Features to Track". Also, the feature-point detection method may be a method for detecting a local feature descriptor, which is typified by a scale-invariant feature transform (SIFT) or speeded up robust features (SURF).

Each time an image is obtained from the image capture unit 3 at a predetermined photography cycle while the control unit 6 executes the natural-feature-point-based orientation estimation processing, the natural-feature-point tracker 13 tracks natural feature points in the image. Also, when the user performs an operation, such as pressing the initial-map generation instruction button, the natural-feature-point tracker 13 associates, of the tracked natural feature points, corresponding natural feature points detected from the second image with natural feature points detected from the first image.

A description will be given of processing in which each time an image is obtained from the image capture unit 3 at each predetermined photography cycle, the natural-feature-point tracker 13 tracks natural feature points in the image. Since natural feature points do not have known shapes, unlike feature points on a marker, it is difficult for the natural-feature-point tracker 13 to determine whether or not a natural feature point detected from one of a plurality of images and a natural feature point detected from another image are the same. Thus, each time another image is obtained after a feature point is detected from a first image, the natural-feature-point tracker 13 tracks the natural feature point to determine to which position in the image the natural feature point has moved. Accordingly, the natural-feature-point tracker 13 tracks each natural feature point, for example, by using the Lucas-Kanade (LK) optical flow and registers the tracking result in a natural-feature-point information table. In the LK optical flow, it is assumed that each pixel in a previously obtained image moves independently according to an individual "motion vector (flow vector)", and the pixel value of each natural feature point detected from a subsequently obtained image remains the same as the luminance value in the previously obtained image. A relational expression for pixel values in a differential image, the expression approximating an equation for the constraint condition "the pixel values before and after movement are not changed" through Taylor expansion, is referred to as "Lucas-Kanade equations". With respect to Lucas-Kanade equations prepared for pixels of detected natural feature points, the natural-feature-point tracker 13 prepares a total of 5×5 (=25) equations as constraint equations for pre-movement and post-movement of a small area N (for example, 5×5 pixels). The natural-feature-point tracker 13 uses a least-squares method to determine a parameter when the sum of the absolute values of errors in the 25 pixels is minimized, to thereby estimate an optical flow of the entire area N. For a tracking scheme using the LK optical flow, a reference is made to, for example, B. D. Lucas and T. Kanade, "An iterative image registration technique with an application to stereo vision", in Proc. Imaging Understanding Workshop, pp. 121-130, 1981.

FIG. 6 illustrates an example of the natural-feature-point information table. The coordinates of a natural feature point in a first image, the coordinate of a natural feature point in a subsequent image, and a tracking flag indicating whether or not the feature point is tracked are stored in each row in a natural-feature-point information table 600. In the natural-feature-point information table, "True" indicates being tracked, and "False" indicates not being trackable. The subsequent image is an image that is generated by the image capture unit 3 at each predetermined photography cycle after the first image is generated when the user performs an operation, such as pressing the initial-map generation start button.

When the user performs an operation, such as pressing the initial-map generation start button, and a natural feature point is detected from the first image, the natural-feature-point tracker 13 registers, in the natural-feature-point information table 600, the coordinates of the detected natural feature point in the first image. Thereafter, each time a subsequent image generated by the image capture unit 3 at each predetermined photography cycle is obtained, the natural-feature-point tracker 13 tracks a natural feature point in the obtained subsequent image and updates the coordinates in the subsequent image and the corresponding tracking flag in the natural-feature-point information table 600. When a natural feature point corresponding to a natural feature point in the first image is also detected from the subsequent image, the natural-feature-point tracker 13 registers the coordinates of the detected feature point with the coordinates in the subsequent image and also sets the corresponding tracking flag to "True". On the other hand, when no natural feature point corresponding to a natural feature point in the first image is detected from the subsequent image, the natural-feature-point tracker 13 leaves the coordinates in the subsequent image blank (for example, null) and also sets the corresponding tracking flag to "False".

The natural-feature-point tracker 13 associates, of the tracked natural feature points, corresponding natural feature points detected from the second image with natural feature points detected from the first image. To this end, when an operation, such as pressing the initial-map generation instruction button, is performed, the natural-feature-point tracker 13 refers to the natural-feature-point information table 600 to read, in the latest subsequent image, the coordinates of each natural feature point for which the tracking flag is "True". The natural-feature-point tracker 13 then regards the latest subsequent image for which the tracking flag for each natural feature point is "True" as the second image, associates the coordinates in the second image for natural feature points detected from the second image and corresponding to the natural feature points detected from the first image, and stores the associated coordinates in the corresponding-point information table 500. For example, the coordinates in the first image for natural feature points detected from the first image and coordinates in the second image for natural feature points detected from the second image corresponding to the natural feature points detected from the first image are stored in the first to 328th rows in the corresponding-point information table 500 in FIG. 5.

The three-dimensional position determiner 14 calculates three-dimensional coordinates in a camera coordinate system for the natural feature points and the four corners of a marker in the first and second images. During the calculation, the three-dimensional position determiner 14 may calculate the three-dimensional coordinates of the natural feature points and the four corners of the marker in the camera coordinate system, based on Epipolar geometry representing geometrical relationships between the first image and the second image acquired by photographing the same subjects (the natural feature points and the four corners of the marker) from different positions. The three-dimensional position determiner 14 performs three processes, that is, calculating a fundamental matrix F for the image capture unit 3 at the first place and the image capture unit 3 at the second place, calculating a perspective projection matrix $P_{pr}$ for the image capture unit 3 at the first place and the image capture unit 3 at the second place, and calculating the three-dimensional coordinates of the natural feature points and the four corners of the marker.

The three-dimensional position determiner 14 calculates the fundamental matrix F in accordance with a procedure described below. First, the three-dimensional position determiner 14 designates the coordinates in the first image at the first place and the coordinates in the second image at the second place, the coordinates being obtained by projecting the natural feature points and the four corners of a marker in three-dimensional space, as (u, v) and (u', v'), respectively. The coordinates (u, v) and the coordinates (u', v') satisfy the following equation called an epipolar constraint.

$$(u' \ v' \ 1) \begin{pmatrix} f_{11} & f_{12} & f_{13} \\ f_{21} & f_{22} & f_{23} \\ f_{31} & f_{32} & f_{33} \end{pmatrix} \begin{pmatrix} u \\ v \\ 1 \end{pmatrix} = 0 \quad (2)$$

In this case, the matrix with 3 rows and 3 columns including nine components, that is, $f_{11}$ to $f_{13}$, $f_{21}$ to $f_{23}$, and $f_{31}$ to $f_{33}$, corresponds to the above-described fundamental matrix F.

Although the number of components in the fundamental matrix F is nine, the substantial number of unknowns is eight, since the fundamental matrix F has indefiniteness of constant multiples. Accordingly, when at least eight points corresponding to each other between the first image and the second image are obtained, the three-dimensional position determiner 14 may determine the fundamental matrix F. For example, using a method called the eight-point algorithm, the three-dimensional position determiner 14 calculates the fundamental matrix F, based on the coordinates of eight natural feature points or the four corners of a marker in each of the first image and the second image. For a scheme for calculating the fundamental matrix F by using the eight-point algorithm, a reference is made to, for example, Richard I. Hartley, "In Defense of the Eight-Point Algorithm", *IEEE Transaction on Pattern Analysis and Machine Intelligence*, Vol. 19, No. 6, pp. 580-593, 1997.

The three-dimensional position determiner 14 calculates the perspective projection matrix $P_{pr}$ for relating both the image capture unit 3 at the first place and the image capture unit 3 at the second place in accordance with a procedure as described below. The three-dimensional position determiner 14 calculates an essential matrix E for relating the image capture unit 3 at the first place to the image capture unit 3 at the second place by using the fundamental matrix F and a matrix A.

$$E = A^T F A \tag{3}$$

where the matrix A represents internal parameters of the image capture unit 3. The internal parameter may be determined in advance. For a scheme for determining the internal parameter, a reference is made to, for example, Zhengyou Zhang, "A flexible new technique for camera calibration", IEEE Transactions on Pattern Analysis and Machine Intelligence, Vol. 22, No. 11, pp. 1330-1334, 2000.

The three-dimensional position determiner 14 performs singular value decomposition on the essential matrix E in accordance with:

$$E = U \Sigma V^T \tag{4}$$

Using an obtained matrix U, the three-dimensional position determiner 14 calculates $R_r$ representing rotational motion components for the camera coordinate system, in accordance with:

$$R_{r1} = U \begin{bmatrix} 0 & -1 & 0 \\ 1 & 0 & 0 \\ 0 & 0 & 1 \end{bmatrix} V^T \tag{5}$$

$$R_{r2} = U \begin{bmatrix} 0 & 1 & 0 \\ -1 & 0 & 0 \\ 0 & 0 & 1 \end{bmatrix} V^T$$

In this case, two types of $R_r$, that is, $R_{r1}$ and $R_{r2}$, are calculated. $R_{r1}$ and $R_{r2}$ have a mirror symmetry relationship in which they are line symmetric with respect to a line that connects the center of the image capture unit 3 at the first place and the center of the image capture unit 3 at the second place.

The three-dimensional position determiner 14 calculates four types of perspective projection matrix $P_{pr}$ in accordance with:

$$F_{pr1} = A(R_{r1}|t)$$

$$F_{pr2} = A(R_{r1}|-t)$$

$$F_{pr3} = A(R_{r2}|t)$$

$$F_{pr4} = A(R_{r2}|-t) \tag{6}$$

where the matrix (Rx|t) means a matrix with 3 rows and 4 columns which is obtained by combining a matrix Rx with 3 rows and 3 columns and a matrix t. The reason why there are four types of perspective projection matrix $P_{pr}$ is that there are mirror symmetry at a combination of the front side and the rear side of the image capture unit 3 at the first place and the image capture unit 3 at the second place (that is, the front side and the front side, the front side and the rear side, the rear side and the front side, and the rear side and the rear side).

The three-dimensional position determiner 14 calculates the three-dimensional coordinates of corresponding feature points in accordance with a procedure as described below. The above-described perspective projection matrix $P_{pr}$ is represented by components $p_{11}$ to $p_{14}$, $p_{21}$ to $p_{24}$, and $p_{31}$ to $p_{34}$ as:

$$P_{pr} = \begin{pmatrix} p_{11} & p_{12} & p_{13} & p_{14} \\ p_{21} & p_{22} & p_{23} & p_{24} \\ p_{31} & p_{32} & p_{33} & p_{34} \end{pmatrix} \tag{7}$$

Then, with respect to the perspective projection matrices $P_{pr1}$ to $P_{pr4}$, the three-dimensional position determiner 14 solves least squares solutions in simultaneous equations for three-dimensional coordinates (X, Y, Z) given by:

$$\begin{pmatrix} -1 & 0 & u \\ 0 & -1 & v \\ p_{31}u' - p_{11} & p_{32}u' - p_{12} & p_{33}u' - p_{13} \\ p_{31}v' - p_{21} & p_{32}v' - p_{22} & p_{33}v' - p_{23} \end{pmatrix} \begin{pmatrix} X \\ Y \\ Z \end{pmatrix} = \begin{pmatrix} 0 \\ 0 \\ p_{14} - p_{34}u' \\ p_{24} - p_{34}v' \end{pmatrix} \tag{8}$$

By using a condition that the natural feature points and the four corners of the marker are located ahead of the image capture unit 3, the three-dimensional position determiner 14 calculates one optimum solution based on the four types of solution obtained above. The three-dimensional position determiner 14 repeats such a calculation on all of the natural feature points and the four corners of the marker to calculate the three-dimensional coordinates of the natural feature points and the four corners of the marker in the first image and the second image. The three-dimensional position determiner 14 then stores, in the storage unit 5, the three-dimensional coordinates of the natural feature points and the four corners of the marker in the first image and the second image. The three-dimensional coordinates obtained through such a procedure are three-dimensional coordinates in the camera coordinate system whose reference is the first place, and has an origin at the position of the image capture unit 3 at the first place. In this case, the three-dimensional position determiner 14 calculates the three-dimensional coordinates of the natural feature points and the four corners of the marker in the first image and the second image. However, the three-dimensional position determiner 14 may calculate the three-dimensional coordinates of the natural feature points, based on the first image and an arbitrary subsequent image of natural feature points being tracked, instead of the second image.

The coordinate converter 16 converts the three-dimensional coordinates in the camera coordinate system into three-dimensional coordinates in a world coordinate system.

Conversion of three-dimensional coordinates (Xc, Yc, Zc) in a camera coordinate system into three-dimensional coordinates (Xm, Ym, Zm) in a world coordinate system is executed, for example, in accordance with:

$$\begin{pmatrix} X_m \\ Y_m \\ Z_m \end{pmatrix} = s \cdot R \begin{pmatrix} X_c \\ Y_c \\ Z_c \end{pmatrix} + T \qquad (9)$$

where s represents a scale change between the pre-coordinate-conversion and the post-coordinate-conversion, R is a matrix representing rotational motion components with 3 rows and 3 columns, and T is a matrix representing translational motion components. The coordinate-conversion-parameter determiner 15 calculates coordinate conversion parameters so that errors are minimized.

FIG. 7 illustrates an overview of the coordinate conversion. Four corners of a marker are referred to as "feature points A, B, C, and D" in the order the upper left, the upper right, the lower right, and the lower left. The three-dimensional position determiner 14 calculates the three-dimensional coordinates in a camera coordinate system for the feature points A, B, C, D corresponding to the four corners of the marker.

When the coordinate converter 16 converts the three-dimensional coordinates of the four corners of the marker from the camera coordinate system into a world coordinate system, the three-dimensional coordinates of the feature points A', B', C', D' in the world coordinate system into which the three-dimensional coordinates of the feature points A, B, C, D in the camera coordinate system are to be converted are prescribed values. Since the world coordinate system set in the real space has its origin at the center of the marker, the barycenter of the feature points A', B', C', D' matches the origin of the world coordinate system. Thus, for instance, when the dimension of one side of the marker in the real space is assumed to be 50 mm, the coordinates of the feature points A', B', C', D' are given, for example, as A'=(−25 mm, 25 mm, 0 mm), B'=(25 mm, 25 mm, 0 mm), C'=(25 mm, −25 mm, 0 mm), and D'=(−25 mm, −25 mm, 0 mm). Accordingly, the coordinate-conversion-parameter determiner 15 calculates the coordinate conversion parameters so that the sum of the absolute values of errors between the three-dimensional coordinates after conversion of the three-dimensional coordinates of the feature points A, B, C, D in the camera coordinate system into three-dimensional coordinates in the world coordinate system and the three-dimensional coordinates of the feature points A', B', C', D'. To this end, using equation (9) noted above, the coordinate-conversion-parameter determiner 15 determines coordinate conversion parameters with which an evaluation value E given by the following equation is minimized.

$$E = \Sigma_i |X_i'(s \cdot R\min \cdot X_i | T\min)|^2 \qquad (10)$$

In this case, the coordinate-conversion-parameter determiner 15 sets the coordinates of each of the feature points A, B, C, D of the four corners of the marker in the camera coordinate system to $X_i$ (1≤i≤4). The coordinate-conversion-parameter determiner 15 sets the coordinates of the feature points A', B', C', D' in the world coordinate system where the feature points A, B, C, D are supposed to be after the coordinate conversion to $X_i'$ (1≤i≤4). Since the evaluation value E is the sum of the distances between the three-dimensional coordinates in the world coordinate system, the three-dimensional coordinates being obtained by converting the three-dimensional coordinates of the feature points A, B, C, D in the camera coordinate system, and the three-dimensional coordinates of the feature points A', B', C', D' where the converted feature points A, B, C, D are supposed to be located, the evaluation value E indicates the sum of the absolute values of errors. A matrix $R_{min}$ representing rotational motion components and a matrix $T_{min}$ representing translational motion components are matrices with which the sum of the absolute values of errors between the three-dimensional coordinates, obtained by converting the three-dimensional coordinates of the feature points A, B, C, D from the camera coordinate system into the world coordinate system, and the three-dimensional coordinates of the feature points A', B', C', D' is minimized. For example, based on singular value decomposition, the coordinate-conversion-parameter determiner 15 determines s representing a scale change between the pre-coordinate-conversion and the post-coordinate-conversion and the coordinate conversion parameters $R_{min}$ and $T_{min}$ with which the sum of the absolute values of the errors is minimized.

First, the coordinate-conversion-parameter determiner 15 determines a barycenter $ABCD_G$ about the feature points A, B, C, D and a barycenter $A'B'C'D'_G$ about the feature points A', B', C', D'. The coordinate-conversion-parameter determiner 15 re-represents three-dimensional coordinates, obtained by subtracting the barycenter $ABCD_G$ and the barycenter $A'B'C'D'_G$ from the three-dimensional coordinates of the four feature points A, B, C, D and the four feature points A', B', C', D', as $X_i$ (1≤i≤4) and $X_i'$ (1≤i≤4), respectively. Thereafter, the coordinate-conversion-parameter determiner 15 calculates a covariance matrix C in accordance with:

$$C = (X_1 X_2 X_3 X_4)(X_1' X_2' X_3' X_4')^T \qquad (11)$$

In this case, the covariance matrix C is a matrix with "3 rows and 3 columns" (="3 rows and 4 columns"×"4 rows and 3 columns"). The coordinate-conversion-parameter determiner 15 performs singular value decomposition on the covariance matrix C in accordance with:

$$C = U\Sigma V^T \qquad (12)$$

The coordinate-conversion-parameter determiner 15 determines the matrix $R_{min}$ representing rotational motion components, in accordance with:

$$R_{min} = V \begin{pmatrix} 1 & 0 & 0 \\ 0 & 1 & 0 \\ 0 & 0 & \det(VU^T) \end{pmatrix} U^T \qquad (13)$$

where det( ) is a function for determining a determinant of a matrix. The coordinate-conversion-parameter determiner 15 determines the scale change s between the pre-coordinate-conversion and the post-coordinate-conversion, in accordance with:

$$s = \frac{tr((X_1 X_2 X_3 X_4)(X_1' X_2' X_3' X_4')^T R_{min})}{tr((X_1 X_2 X_3 X_4)^T (X_1 X_2 X_3 X_4))} \qquad (14)$$

where tr( ) is a function for determining a matrix trace.

The coordinate-conversion-parameter determiner 15 determines the matrix $T_{min}$ representing translational motion components, in accordance with:

$$T_{min} = X_G' - sR_{min} X_G \qquad (16)$$

The matrix $R_{min}$ representing the rotational motion components, the scale change s, and the matrix $T_{min}$ representing the translational motion components are the coordinate conversion parameters. The coordinate-conversion-parameter determiner 15 passes the coordinate conversion parameters, including the matrix $R_{min}$ representing the rotational motion components, the scale change s, and the matrix $T_{min}$ representing the translational motion components, to the coordinate converter 16.

Based on $R_{min}$, $T_{min}$, and s determined by the coordinate-conversion-parameter determiner 15, the coordinate converter 16 determines coordinates $X_i''$ in the world coordinate system after the coordinate conversion, with respect to the three-dimensional coordinates of the natural feature points and the four corners of the marker in the first image and the second image, in accordance with:

$$X_i'' = sR_{min}X_i + T_{min} \qquad (16)$$

The register 17 stores, in the initial map, all of the determined three-dimensional coordinates of the natural feature points and the four corners of the marker in the world coordinate system.

FIG. 8 is a table illustrating an example of the initial map. The three-dimensional coordinates of any of the natural feature points and the four corners at the periphery of the marker in the world coordinate system and a type flag indicating whether a feature point in question is a feature point on a marker or a natural feature point are stored in each row in an initial map 800, where m indicates a marker and f indicates a natural feature point. In this example, for example, the three-dimensional coordinates in a world coordinate system for natural feature points and so on are stored in the first to 328th rows. The three-dimensional coordinates in the world coordinate system for the four corners of the marker and so on are stored in the 329th to 332nd rows.

Immediately after an operation, such as pressing the initial-map generation instruction button, is performed, the natural-feature-point-based orientation estimator 18 estimates the position and the orientation of the image capture unit 3, based on the registered initial map and the coordinate conversion parameters for conversion from the camera coordinate system into the world coordinate system. To this end, for example, the natural-feature-point-based orientation estimator 18 reversely converts the coordinate conversion parameters for conversion from the camera coordinate system into the world coordinate system, the coordinate conversion parameters being obtained by the coordinate-conversion-parameter determiner 15, and determines coordinate conversion parameters for conversion from the world coordinate system into the camera coordinate systems as initial values.

$$\begin{bmatrix} X_c \\ Y_c \\ Z_c \\ 1 \end{bmatrix} = \begin{pmatrix} R & T \\ 0 & 0 & 0 & 1 \end{pmatrix} \begin{bmatrix} X_m \\ Y_m \\ Z_m \\ 1 \end{bmatrix} = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} \begin{bmatrix} X_m \\ Y_m \\ Z_m \\ 1 \end{bmatrix} \qquad (17)$$

where $(X_c, Y_c, Z_c)$ represents the three-dimensional coordinates in the camera coordinate system which correspond to a point at the three-dimensional coordinates $(X_m, Y_m, Z_m)$ in the world coordinate system, R represents a matrix for rotational motion components, and T represents a matrix for translational motion components.

Figure 9:
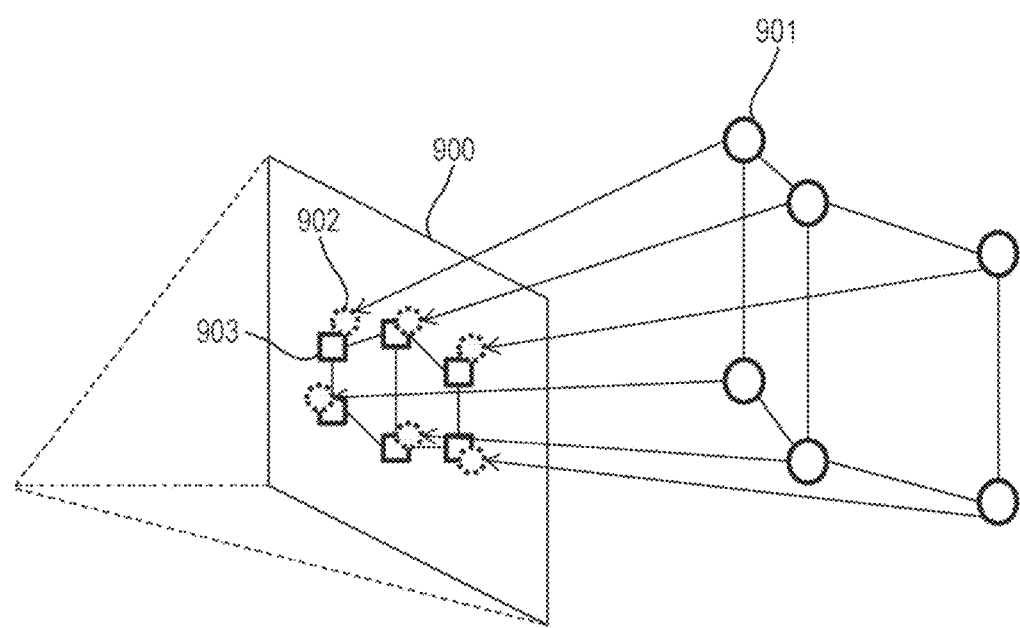
FIG. 9 is a conceptual diagram of natural-feature-point-based orientation estimation processing.

FIG. 9 is a conceptual diagram of the natural-feature-point-based orientation estimation processing immediately after an operation, such as pressing the initial-map generation instruction button, is performed. Based on a perspective transformation model, the relationship between the camera coordinate system and the coordinate system in an image generated by the image capture unit 3 is represented in accordance with a following equation:

$$\begin{bmatrix} xc \\ yc \\ h \\ 1 \end{bmatrix} = P \begin{bmatrix} X_c \\ Y_c \\ Z_c \\ 1 \end{bmatrix} = \begin{bmatrix} P_{11} & P_{12} & P_{13} & 0 \\ 0 & P_{12} & P_{13} & 0 \\ 0 & 0 & 1 & 0 \\ 0 & 0 & 0 & 1 \end{bmatrix} \begin{bmatrix} X_c \\ Y_c \\ Z_c \\ 1 \end{bmatrix} \qquad (18)$$

where (xc, yc) represent coordinates in an image which correspond to a point at the three-dimensional coordinates (Xc, Yc, Zc) in the camera coordinate system. In accordance with two equations (17) and (18) noted above, the natural-feature-point-based orientation estimator 18 projects natural feature points 901 registered in the initial map onto an image plane 900 and determines the coordinates of projected points 902 on the image plane 900 which correspond to the coordinates of the natural feature points in the world coordinate system. With respect to the natural feature points, the natural-feature-point-based orientation estimator 18 calculates, as an evaluation value, the sum of squares of the distances between the projection points 902 and corresponding natural feature points 903 detected from the image.

The natural-feature-point-based orientation estimator 18 determines the evaluation value, for example, in accordance with a steepest descent method, while modifying the elements in the rotational motion components and the translational motion components. In accordance with the rotational motion components and the translational motion components with which the evaluation value is minimized, the natural-feature-point-based orientation estimator 18 determines estimation values of the position and the orientation of the image capture unit 3.

As described above, in the present embodiment, the natural-feature-point-based orientation estimator 18 calculates the coordinate conversion parameters, based on a plurality of feature points of the marker. The initial values of the position and the orientation of the image capture unit 3, the initial values corresponding to the coordinate conversion parameters, are highly likely to be close to the actual position and orientation of the image capture unit 3. Accordingly, for estimating the position and the orientation, the natural-feature-point-based orientation estimator 18 is highly likely to be able to determine the position and the orientation with which the evaluation value takes a minimum value, without the evaluation value falling into a local minimum. Accordingly, the natural-feature-point-based orientation estimator 18 may enhance the estimated accuracies of the position and the orientation of the image capture unit 3.

Figure 10:
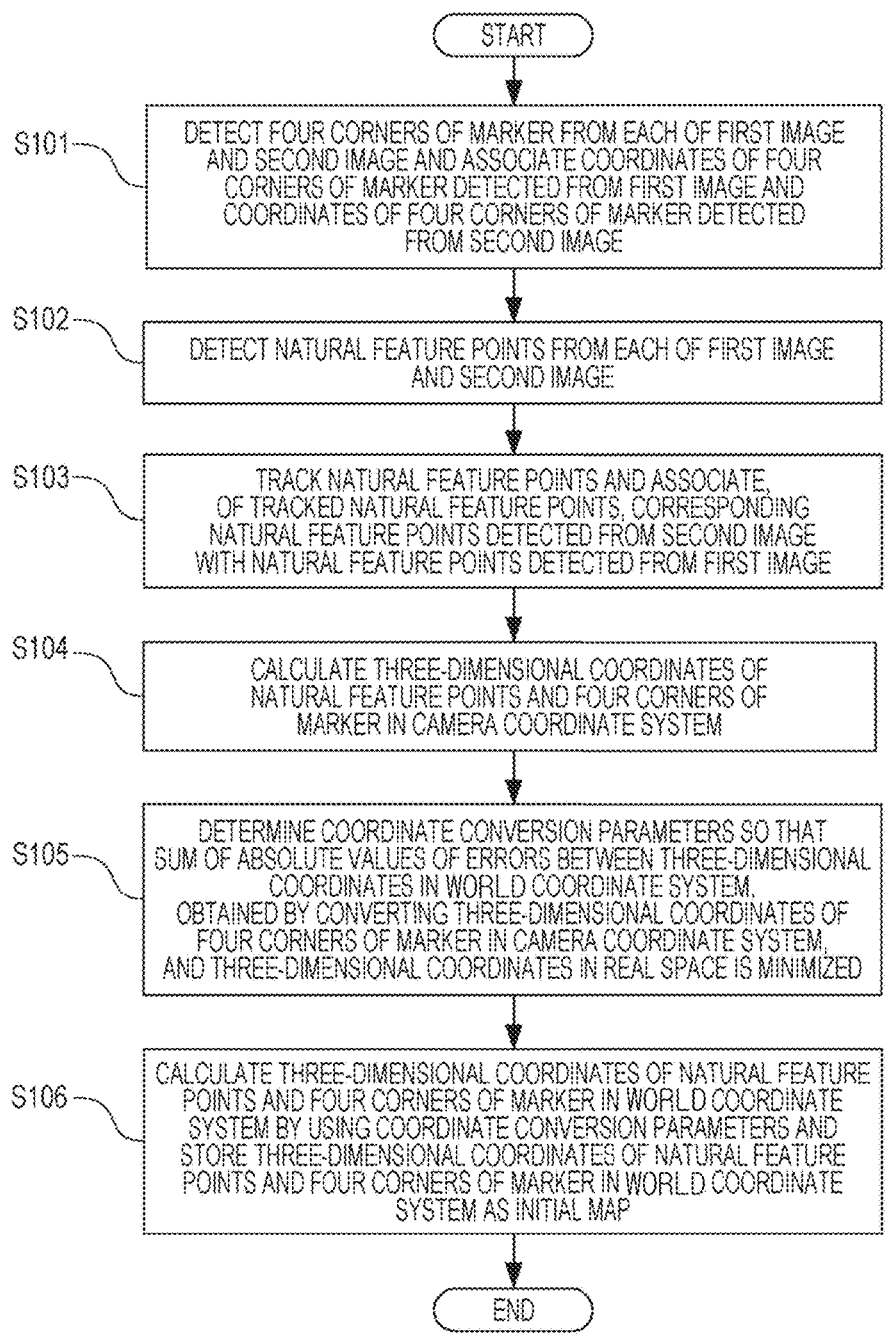
FIG. 10 is an operation flowchart of coordinate-conversion-parameter determination processing executed by the control unit in the portable terminal.

FIG. 10 is an operation flowchart of coordinate-conversion-parameter determination processing executed by the control unit 6 in the portable terminal 1. Each time the user operates the initial-map generation instruction button, the control unit 6 executes the coordinate-conversion-parameter determination processing in accordance with the operation flowchart described below.

The marker detector 11 detects four corners of a marker from each of a first image and a second image, associates the coordinates of the four corners of the marker detected from the first image and the coordinates of the four corners of the marker detected from the second image, and stores the associated coordinates in the corresponding-point information table (step S101). The natural-feature-point detector 12 detects natural feature points from each of the first image and the second image (step S102). The natural-feature-point tracker 13 tracks the natural feature points, associates, of the tracked natural feature points, corresponding natural feature points detected from the second image with the natural feature points detected from the first image, and stores the associated natural feature points in the corresponding-point information table (step S103). The three-dimensional position determiner 14 calculates the three-dimensional coordinates of the natural feature points and the four corners of the marker in a camera coordinate system (step S104). The coordinate-conversion-parameter determiner 15 determines coordinate conversion parameters so that the sum of the absolute values of errors between three-dimensional coordinates in a world coordinate system, the three-dimensional coordinates being obtained by converting the three-dimensional coordinates of the four corners of the marker in the camera coordinate system by using the coordinate conversion parameters, and three-dimensional coordinates in real space is minimized (step S105). By using the coordinate conversion parameters, the coordinate converter 16 calculates the three-dimensional coordinates obtained by converting the three-dimensional coordinates of the natural feature points and the four corners of the marker from the camera coordinate system into the world coordinate system. The register 17 then stores the three-dimensional coordinates of the natural feature points and the four corners of the marker in the world coordinate system in the storage unit 5 as an initial map (step S106).

As described above, this coordinate-conversion-parameter determination apparatus calculates the coordinate conversion parameters such that the sum of the absolute values of errors between the three-dimensional coordinates, obtained by converting the three-dimensional coordinates of the four corners of the marker in the camera coordinate system, and the three-dimensional coordinates in the real space is minimized. By using the coordinate conversion parameters, the coordinate-conversion-parameter determination apparatus converts the three-dimensional coordinates of the natural feature points and the four corners of the marker in the camera coordinate system into three-dimensional coordinates in the world coordinate system. Accordingly, the coordinate-conversion-parameter determination apparatus may enhance the accuracy of conversion of the three-dimensional coordinates of the natural feature point and the four corners of the marker in the camera coordinate system into the three-dimensional coordinates in the world coordinate system.

There are cases in which the errors between the three-dimensional coordinates in the world coordinate system, the three-dimensional coordinates being obtained by the three-dimensional position determiner 14 converting the three-dimensional coordinates of the natural feature points and the feature points of the marker in the camera coordinate system, and the three-dimensional coordinates in the real space become large. Such cases occur because of shortage of the number of dimensions in the process of calculation when the first place and the second place are not spatially sufficiently away from each other or when the natural feature points are in a flat plane. Accordingly, according to a modification, a three-dimensional-coordinate distortion determiner may determine whether or not a shape obtained by connecting the three-dimensional coordinates of a plurality of feature points of a marker, the three-dimensional coordinates being calculated by the three-dimensional position determiner 14, satisfies a predetermined permissible value described below. When the three-dimensional-coordinate distortion determiner determines that the shape obtained by connecting the three-dimensional coordinates of the feature points of the marker does not satisfy the permissible value, the coordinate-conversion-parameter determiner 15 does not calculate the coordinate conversion parameters.

Figure 11:
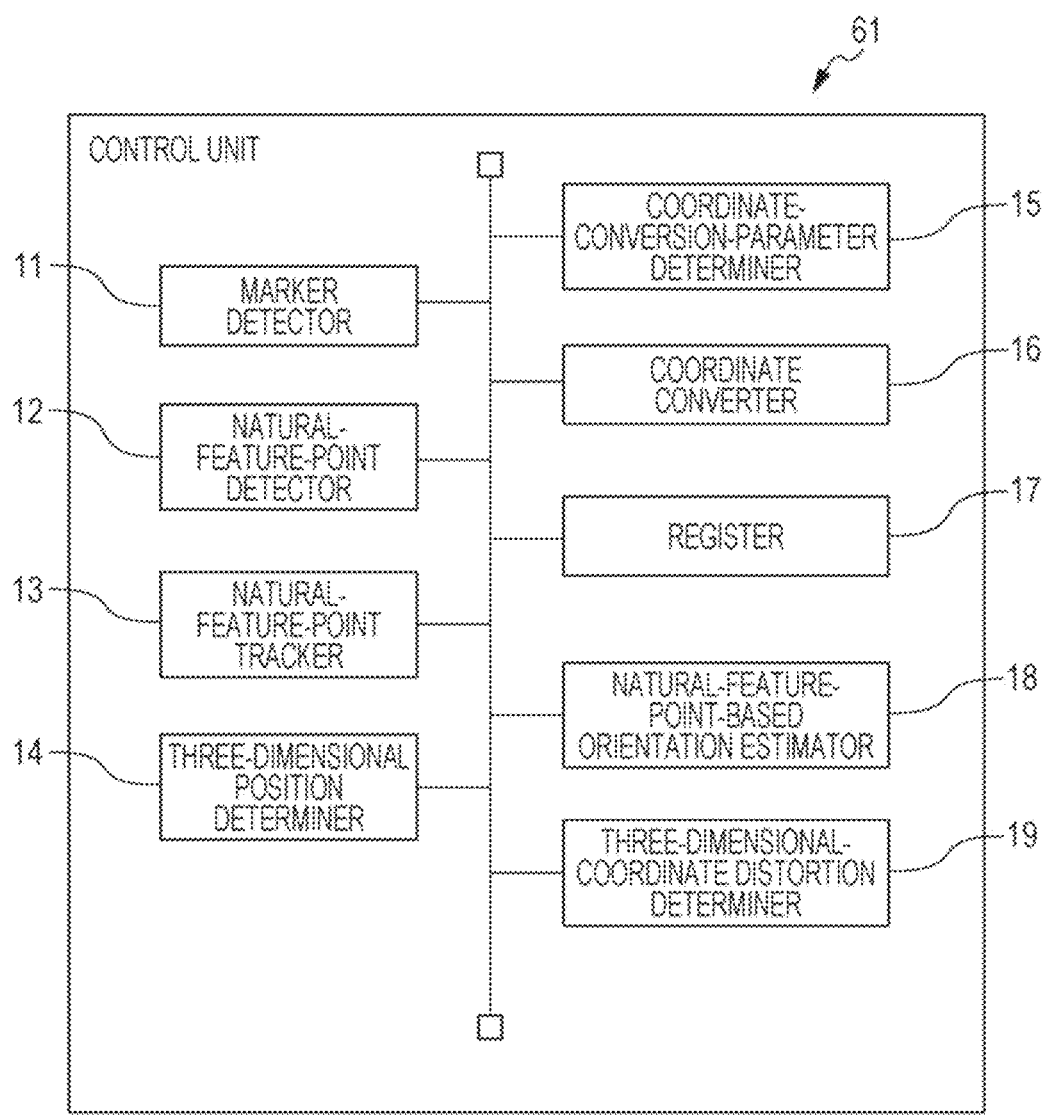
FIG. 11 is a functional block diagram of a control unit related to estimation of the position and the orientation of the image capture unit according to this modification.

FIG. 11 is a functional block diagram of a control unit 61 related to estimation of the position and the orientation of the image capture unit 3 according to this modification. The control unit 61 includes a marker detector 11, a natural-feature-point detector 12, a natural-feature-point tracker 13, a three-dimensional position determiner 14, a coordinate-conversion-parameter determiner 15, a coordinate converter 16, a register 17, a natural-feature-point-based orientation estimator 18, and a three-dimensional-coordinate distortion determiner 19. The control unit 61 in this modification differs from the control unit 6 in the above-described embodiment in that the control unit 61 includes the three-dimensional-coordinate distortion determiner 19. Thus, the following description will be given of the three-dimensional-coordinate distortion determiner 19 and portions relevant thereto. For details of the other constituent elements included in the control unit 61, a reference is made to the descriptions of the corresponding constituent elements in the above-described embodiment.

Figure 12A:
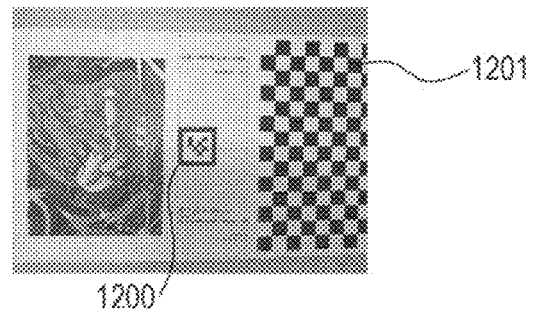
FIG. 12A is a view of an example in which a checkerboard pattern is set at the right side of a marker.
Figure 12B:
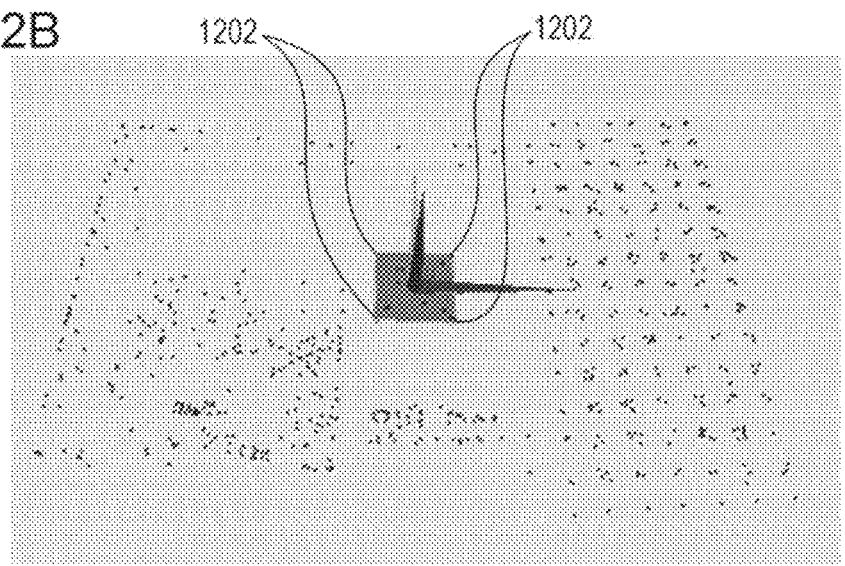
FIG. 12B is a view of an example in which three-dimensional coordinates are displayed in a three-dimensional manner when the initial map has no distortion.
Figure 12C:
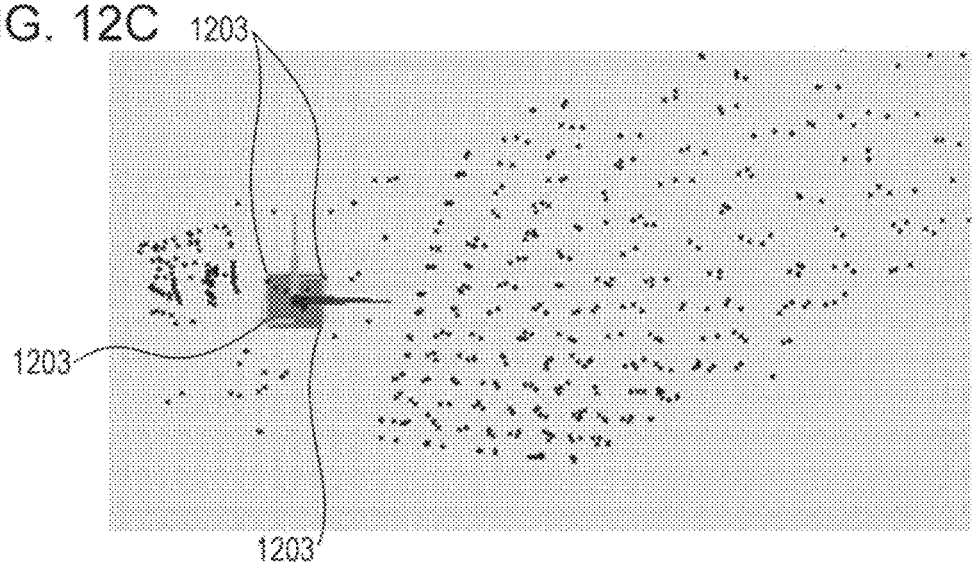
FIG. 12C is a view of an example in which three-dimensional coordinates are displayed in a three-dimensional manner when the initial map has distortion.

FIG. 12A is a view of an example in which a checkerboard pattern 1201 is set at the right side of a marker 1200. FIG. 12B is a view of an example in which three-dimensional coordinates are displayed in a three-dimensional manner when the initial map has no distortion. FIG. 12C is a view of an example in which three-dimensional coordinates are displayed in a three-dimensional manner when the initial map has distortion. When the initial map has no distortion, the checkerboard pattern 1201 in FIG. 12A is aligned at certain intervals, and thus natural feature points detected from the checkerboard pattern at the right side of the marker in FIG. 12B are also aligned at certain intervals. Also, in FIG. 12B, four corners 1202 of the marker in the three-dimensional coordinates in the camera coordinate system which are calculated by the three-dimensional position determiner 14 substantially match the four corners of the marker in the image. However, when the initial map has distortion, the array of the natural feature points detected from the checkerboard pattern at the right side of the marker in FIG. 12C is distorted. Also, in FIG. 12C, four corners 1203 of the marker in the three-dimensional coordinates calculated by the three-dimensional position determiner 14 are displaced from the four corners of the marker in the image.

Accordingly, the three-dimensional-coordinate distortion determiner 19 determines whether or not the shape obtained by connecting the three-dimensional coordinates of the four corners of the marker is likely to be a shape obtained by connecting a plurality of feature points, to thereby determine whether or not the initial map has distortion. In this modification, since the plurality of feature points are the four corners of the marker, the shape obtained by connecting the plurality of feature points, is a square. For example, the three-dimensional-coordinate distortion determiner 19 determines whether or not the shape obtained by connecting the three-dimensional coordinates of the four corners of the marker in the camera coordinate system is likely to be a square, based on the following three references. Only when all of the three references satisfy corresponding predetermined permissible values, the three-dimensional-coordinate distortion determiner 19 determines that the shape obtained by connecting the three-dimensional coordinates of the four corners of the marker is likely to be a square, and the coordinate-conversion-parameter determiner 15 calculates coordinate conversion parameters.

On the other hand, when even one of the three references does not satisfy the corresponding predetermined permissible value, the three-dimensional-coordinate distortion determiner 19 determines that the shape obtained by connecting the three-dimensional coordinates of the four corners of the marker is not a square, performs error display indicating that the shape obtained by connecting the three-dimensional coordinates is distorted, and finishes the processing. In this case, the coordinate-conversion-parameter determiner 15 does not calculate the coordinate conversion parameters. After the processing is finished, the control unit 61 may display, on the user interface unit 2, a message for prompting the user to acquire the first image and the second image again. The following description will be given of the three references with which a determination is made as to whether or not the shape obtained by connecting the three-dimensional coordinates of the four corners of the marker is likely to be a square.

Based on a first reference, the three-dimensional-coordinate distortion determiner 19 determines whether or not the shape obtained by connecting the three-dimensional coordinates of the four corners of the marker in the camera coordinate system, the three-dimensional coordinates being calculated by the three-dimensional position determiner 14, is a diamond shape, not a square. For example, when the average sum of squares of the differences each of which is obtained as the difference between the right angle (90°) and respective angles of the four corners of the marker is larger than or equal to a predetermined permissible value (for example, 10°), the three-dimensional-coordinate distortion determiner 19 determines that the shape obtained by connecting the three-dimensional coordinates of the four corners of the marker is a diamond shape, not a square. On the other hand, when the average sum of squares of the differences each of which is obtained as the difference between the right angle (90°) and respective angles of the four corners of the marker is smaller than the predetermined permissible value (for example, 10°), the three-dimensional-coordinate distortion determiner 19 determines that the shape obtained by connecting the three-dimensional coordinates of the four corners of the marker is likely to be a square.

Based on a second reference, the three-dimensional-coordinate distortion determiner 19 determines whether or not the shape obtained by connecting the three-dimensional coordinates of the four corners of the marker in the camera coordinate system, the three-dimensional coordinates being calculated by the three-dimensional position determiner 14, is a rectangle, not a square. When the average sum of squares of the differences between the length of each side of the quadrangle defined by the four corners of the marker and a length M of a prescribed side of the square defined by the four corners of the marker in real space is larger than or equal to a predetermined permissible value (for example, M×0.2=1 mm), the three-dimensional-coordinate distortion determiner 19 determines that the shape obtained by connecting the three-dimensional coordinates of the four corners of the marker is not a square. The length M of the prescribed side of the square defined by the four corners of the marker in the real space is, for example, 50 mm. On the other hand, when the average sum of squares of the differences between the length of each side of the quadrangle defined by the four corners of the marker and the length M of the prescribed side of the square defined by the four corners of the marker in the real space is smaller than the predetermined permissible value, the three-dimensional-coordinate distortion determiner 19 determines that the shape obtained by connecting the three-dimensional coordinates of the four corners of the marker is likely to be a square.

Based on a third reference, the three-dimensional-coordinate distortion determiner 19 determines whether or not the shape obtained by connecting the three-dimensional coordinates of the four corners of the marker in the camera coordinate system, the three-dimensional coordinates being calculated by the three-dimensional position determiner 14, is distorted. For example, when the distance between a plane defined by three points corresponding to arbitrary three corners among the four corners of the marker and the remaining one point corresponding the remaining corner is larger than or equal to a predetermined permissible value (for example, M×0.2=1 mm), the three-dimensional-coordinate distortion determiner 19 determines that the shape obtained by connecting the three-dimensional coordinates of the four corners of the marker is distorted, not a flat square. On the other hand, when the distance between the plane defined by the three points corresponding to the arbitrary three corners among the four corners of the marker and the remaining one point corresponding the remaining corner is smaller than the predetermined permissible value (for example, M×0.2=1 mm), the three-dimensional-coordinate distortion determiner 19 determines that the shape obtained by connecting the three-dimensional coordinates of the four corners of the marker is likely to be an undistorted flat square.

As described above, when the three-dimensional-coordinate distortion determiner 19 determines that the shape obtained by connecting the three-dimensional coordinates of the four corners of the marker in the camera coordinate system is not a square, the calculation of the coordinate conversion parameters is not performed, and the processing is finished, thus reducing the amount of computation.

Also, even when it is determined that the shape obtained by connecting the three-dimensional coordinates of the feature points of the marker in the camera coordinate system, the three-dimensional coordinates being calculated by the three-dimensional position determiner 14, matches the shape obtained by connecting the feature points of the marker in the real space, error exists to an extent that does not exceed a predetermined permissible value. In order to calculate more accurate coordinate conversion parameters, it is preferable that a marker-coordinate corrector brings the shape, obtained by connecting the feature points of the marker in the camera coordinate system, in advance to as close as possible to the shape obtained by connecting the feature points of the marker in the real space. Accordingly, according to an alternative modification, the marker-coordinate corrector may correct the shape obtained by connecting the three-dimensional coordinates of the feature points of the marker in the camera coordinate system, the three-dimensional coordinates being calculated by the three-dimensional position determiner 14, so that the shape matches the shape obtained by connecting the feature points of the marker in the real space.

Figure 13:
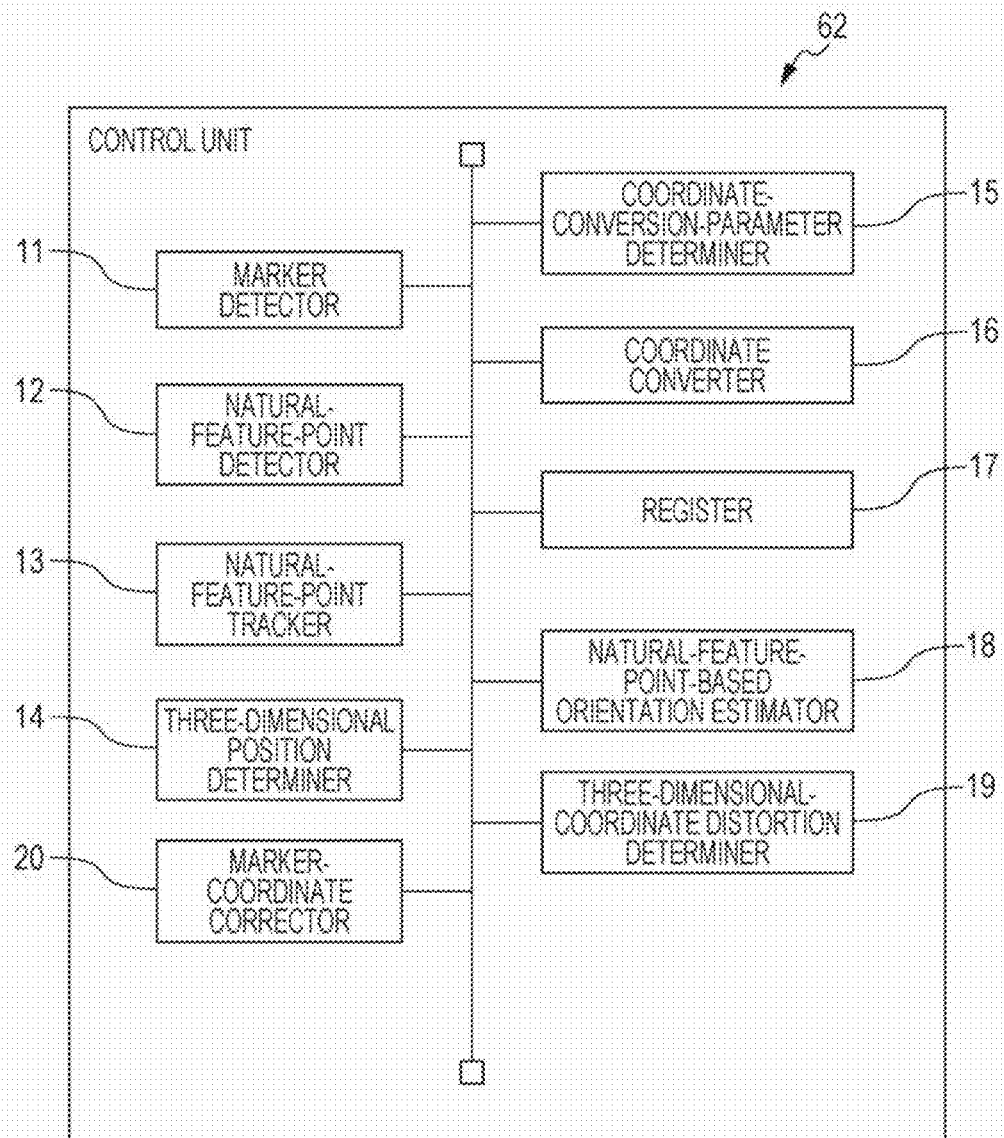
FIG. 13 is a functional block diagram of a control unit related to estimation of the position and the orientation of the image capture unit according to an alternative modification.

FIG. 13 is a functional block diagram of a control unit 62 related to estimation of the position and the orientation of the image capture unit 3 according to an alternative modification. The control unit 62 includes a marker detector 11, a natural-feature-point detector 12, a natural-feature-point tracker 13, a three-dimensional position determiner 14, a coordinate-conversion-parameter determiner 15, a coordinate converter 16, a register 17, and a natural-feature-point-based orientation estimator 18. The control unit 62 further includes a three-dimensional-coordinate distortion determiner 19 and a marker-coordinate corrector 20. The control unit 62 in the alternative modification differs from the control unit 61 in the above-described modification in that the control unit 62 includes the marker-coordinate corrector 20. Thus, the description below will be given of the marker-coordinate corrector 20 and portions relevant thereto. For details of the other constituent elements included in the control unit 62, a reference is made to the descriptions of the corresponding constituent elements in the above-described embodiments and modifications.

In the present embodiment, since the marker is a square and the plurality of feature points are the four corners of the marker, the marker-coordinate corrector 20 creates four pairs each including fixed feature points among the four feature points defined by the three-dimensional coordinates of the four corners of the marker in the camera coordinate system, while changing the combination of the feature points. With respect to each of the pairs of fixed feature points the marker-coordinate corrector 20 corrects the positions of the feature points other than the fixed feature points so that the shape obtained by connecting the three-dimensional coordinates of the feature points of the marker in the camera coordinate system matches the shape obtained by connecting the feature points of the marker in real space.

Figure 14:
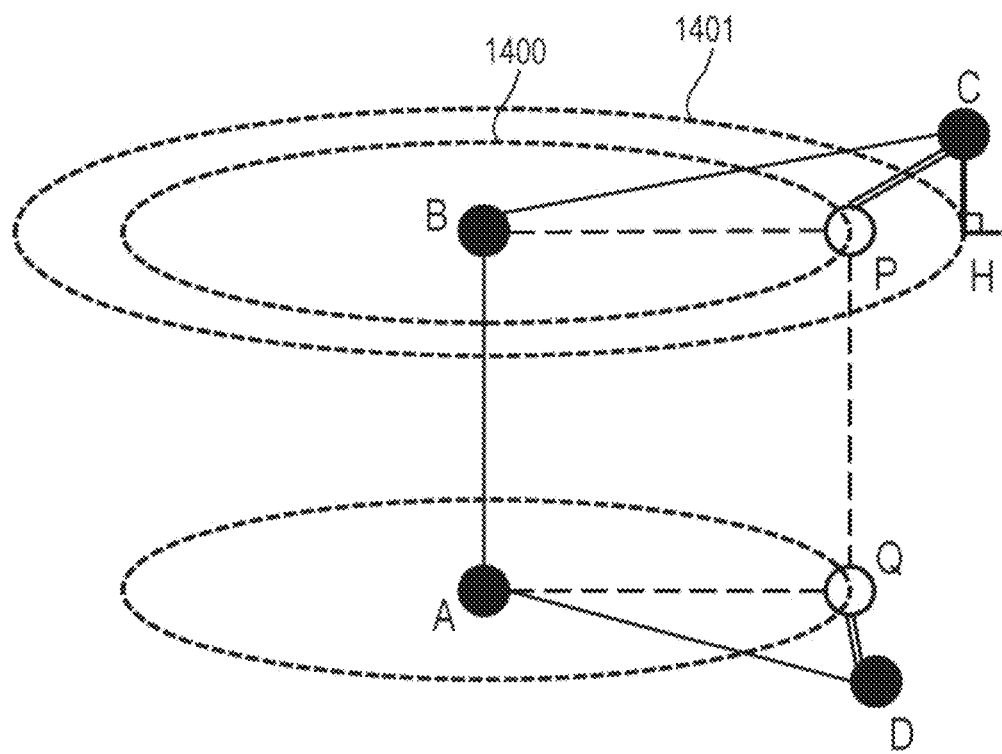
FIG. 14 is a diagram illustrating an overview of correction of the three-dimensional coordinates of four corners of a marker.

FIG. 14 is a diagram illustrating an overview of correction of the three-dimensional coordinates of the four corners of a marker. The marker-coordinate corrector 20 designates the four corners of the marker as feature points A, B, C, and D, designates the feature points A and B as fixed feature points, and designates the feature points C and D as two feature points to be corrected other than the fixed feature points A and B. The marker-coordinate corrector 20 does not correct the fixed feature points A and B, corrects the feature points C and D other than the fixed feature points A and B, and makes the shape, obtained by connecting the three-dimensional coordinates of the four feature points in the camera coordinate system, become a square. Thus, the marker-coordinate corrector 20 corrects the feature points C and D to feature points P and Q on a circumference 1400 of a circular cylinder having its center on a line segment AB and having a radius |AB|. The marker-coordinate corrector 20 drops a perpendicular CH from the feature point C onto a circumference 1401 of a circular cylinder having its center on the line segment AB and designates the intersection of a line segment BH and the circumference 1400 as a feature point P. The marker-coordinate corrector 20 designates a point, obtained by movement from the feature point P in parallel with a vector BA by an amount corresponding to the length of the vector BA, as a feature point Q. Each of the length of a double line CP and the length of a double line DQ represents the distance of a difference between the three-dimensional coordinates of the feature point before the correction and the three-dimensional coordinates of the feature point after the correction. Thus, in order to calculate the length of the double line CP and the length of the double line DQ, the marker-coordinate corrector 20 calculates the length of the perpendicular CH in accordance with:

$$CH = \frac{\overrightarrow{AB} \cdot \overrightarrow{BC}}{|\overrightarrow{AB}|} \quad (19)$$

The marker-coordinate corrector 20 calculates the length of the double line CP in accordance with:

$$CP = \sqrt{AB^2 \ 2AB\sqrt{BC^2 \ CH^2} \ | \ BC^2} \quad (20)$$

The marker-coordinate corrector 20 calculates the length of the double line DQ in accordance with:

$$DQ = \left| \overrightarrow{OA} - \frac{CH}{\sqrt{BC^2 - CH^2}} \overrightarrow{AB} + \frac{AB}{\sqrt{BC^2 - CH^2}} \overrightarrow{BC} - \overrightarrow{OD} \right| \quad (21)$$

where O represents the origin of the world coordinate system before the coordinate conversion, and ∥ represents the distance of a vector. The marker-coordinate corrector 20 calculates each of the lengths of the double line CP and the length of the double line DQ as a distance between a three-dimensional coordinate of a feature point before the correction and a three-dimensional coordinate of a feature point after the correction which is corresponding to the feature point before the correction. The marker-coordinate corrector 20 calculates a sum of these lengths as a sum of the length of the double line CP and the length of the double line DQ.

With respect to each of the other three pairs of feature points, the marker-coordinate corrector 20 corrects the two feature points adjacent to each other and to be corrected other than the two fixed feature points adjacent to each other among the four corners of the marker so that the shape obtained by connecting the three-dimensional coordinates of the four corners of the marker becomes a square. In addition, with respect to each of the other three pairs of feature points, the marker-coordinate corrector 20 calculates each of the distances which is the length between the three-dimensional coordinate of the feature point before the correction and the three-dimensional coordinate of the feature point after the correction which is corresponding to the feature point before the correction and calculates the sum of the distances with respect to the two feature points to be corrected. In order for the shape obtained by connecting the three-dimensional coordinates of the four corners of the marker to become a square, the marker-coordinate corrector 20 corrects the feature points other than the two fixed feature points that are included in the pair with which the sum of the distances between the three-dimensional coordinates of the two feature points before the correction and the three-dimensional coordinates of the two feature points after the correction is minimized. For example, the marker-coordinate corrector 20 determines the two feature points P and Q after the correction, in accordance with:

$$\overrightarrow{OP} = \overrightarrow{OB} - \frac{CH}{\sqrt{BC^2 - CH^2}} \overrightarrow{AB} + \frac{AB}{\sqrt{BC^2 - CH^2}} \overrightarrow{BC} \quad (22)$$

$$\overrightarrow{OQ} = \overrightarrow{OA} - \frac{CH}{\sqrt{BC^2 - CH^2}} \overrightarrow{AB} + \frac{AB}{\sqrt{BC^2 - CH^2}} \overrightarrow{BC}$$

The marker-coordinate corrector 20 passes, to the coordinate-conversion-parameter determiner 15, the three-dimensional coordinates of the two fixed feature points, included in the pair with which the sum of the distances between the three-dimensional coordinates of the two feature points before the correction and the three-dimensional coordinates of the two feature points after the correction is minimized, and the three-dimensional coordinates of the two feature points after the correction. By using the three-dimensional coordinates of the two fixed feature points and the three-dimensional coordinates of the two feature points after the correction in the camera coordinate system, the coordinate-conversion-parameter determiner 15 calculates the three-dimensional-coordinate conversion parameters.

As described above, the marker-coordinate corrector 20 performs correction so that the shape obtained by connecting the three-dimensional coordinates of the four corners of the marker including the two fixed feature points and the corresponding two feature to be corrected, the two fixed feature points being included in the pair with which the sum of the distances between the three-dimensional coordinates of the two feature points before the correction and the three-dimensional coordinates of the two feature points after the correction is minimized, becomes a square. By using the three-dimensional coordinates of the corrected feature points of the marker in the camera coordinate system, the coordinate-conversion-parameter determiner 15 calculates the three-dimensional-coordinate conversion parameters. As a result of the processing described above, the coordinate converter 16 may enhance the accuracy of conversion of the three-dimensional coordinates of feature points between the camera coordinate system and the world coordinate system.

Also, even when the two feature points to be corrected other than the fixed feature points are corrected so that the shape obtained by connecting the three-dimensional coordinates of the feature points of the marker matches the shape obtained by connecting the feature points of the marker in the real space, there are cases in which the coordinates resulting from the coordinate conversion are not successfully converted into the positions where the resulting feature points are supposed to be located. That is, there are cases in which the shape obtained by connecting the three-dimensional coordinates of the feature points of the marker in the camera coordinate system, the three-dimensional coordinates being calculated by the three-dimensional position determiner 14, is distorted three-dimensionally. In such cases, even when the marker-coordinate corrector 20 corrects the two feature points other than the fixed feature points so that the shape obtained by connecting the three-dimensional coordinates of the feature points of the marker matches the shape obtained by connecting the feature points of the marker in the real space, error may occur in the result of the coordinate conversion. Accordingly, according to another alternative modification, when a large amount of error exists, a coordinate-conversion-parameter re-estimation determiner may determine that the coordinate conversion has failed and may re-estimate the coordinate conversion parameters with respect to the other three pairs of fixed feature points.

Figure 15:
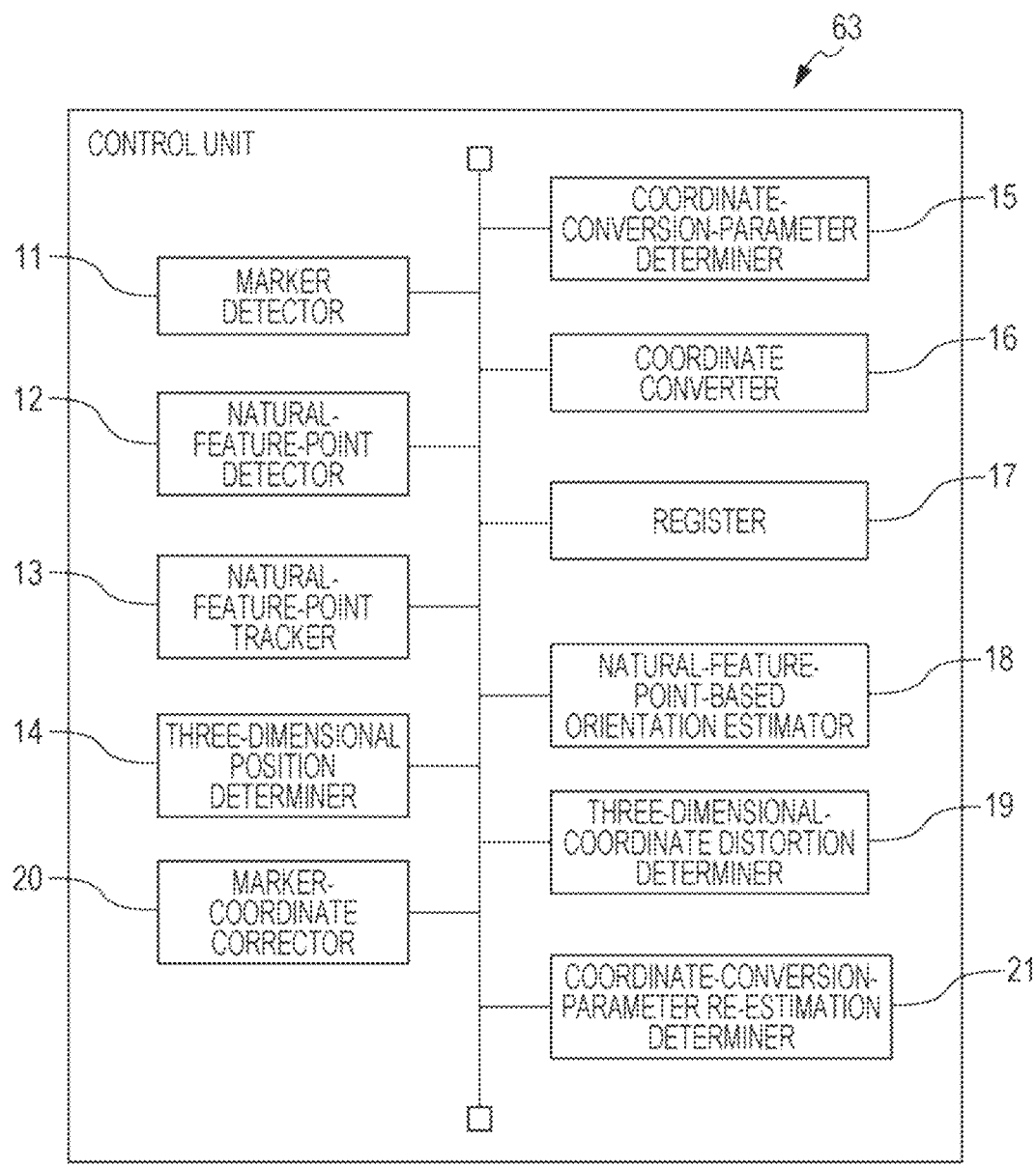
FIG. 15 is a functional block diagram of a control unit related to estimation of the position and the orientation of the image capture unit according to another alternative modification.

FIG. 15 is a functional block diagram of a control unit 63 related to estimation of the position and the orientation of the image capture unit 3 according to another alternative modification. The control unit 63 includes a marker detector 11, a natural-feature-point detector 12, a natural-feature-point tracker 13, a three-dimensional position determiner 14, a coordinate-conversion-parameter determiner 15, a coordinate converter 16, a register 17, and a natural-feature-point-based orientation estimator 18. The control unit 63 further includes a three-dimensional-coordinate distortion determiner 19, a marker-coordinate corrector 20, and a coordinate-conversion-parameter re-estimation determiner 21. The control unit 63 in this modification differs from the control unit 62 in the above-described modification in that the control unit 63 includes the coordinate-conversion-parameter re-estimation determiner 21. Thus, the description below will be given of the coordinate-conversion-parameter re-estimation determiner 21 and portions relevant thereto. For details of the other constituent elements included in the control unit 63, a reference is made to the descriptions of the corresponding constituent elements in the above-described embodiments, modification, and alternative modifications.

In the present embodiment, since the marker is a square and the plurality of feature points are the four corners of the marker, the coordinate-conversion-parameter re-estimation determiner 21 calculates the distance D between the barycenter of the four corners of the marker in the world coordinate system and the barycenter of the four corners of the marker converted by the coordinate converter 16 into the three-dimensional coordinates in the world coordinate system. When the distance D is smaller than a predetermined permissible value (for example, M×5=250 mm) indicating a large amount of error, the coordinate-conversion-parameter re-estimation determiner 21 determines that the coordinate conversion has succeeded.

On the other hand, when the distance D is larger than or equal to the predetermined permissible value (for example, M×5=250 mm) indicating a large amount of error, the coordinate-conversion-parameter re-estimation determiner 21 determines that the coordinate conversion has failed. When it is determined that the coordinate conversion has failed, the marker-coordinate corrector 20 corrects, with respect to each of the other three pairs of fixed feature points, the positions of the two feature points to be corrected other than the fixed feature points so that the shape obtained by connecting the three-dimensional coordinates of the four corners of the marker becomes a square. With respect to each of the other three pairs of fixed feature points, the coordinate-conversion-parameter determiner 15 calculates coordinate conversion parameter candidates, based on the three-dimensional coordinates of the two fixed feature points and the three-dimensional coordinates of the feature points after the correction. With respect to each of the other three pairs of fixed feature points, the coordinate converter 16 converts the three-dimensional coordinates of the four corners of the marker in the camera coordinate system into three-dimensional coordinates in the world coordinate system by using the determined coordinate conversion parameter candidates. With respect to each of the other three pairs of fixed feature points, the coordinate-conversion-parameter re-estimation determiner 21 calculates the distance D between the barycenter of the marker in the world coordinate system and the barycenter of the four corners of the marker converted into the three-dimensional coordinates in the world coordinate system.

The coordinate-conversion-parameter re-estimation determiner 21 executes the above-described processing on each of the other three pairs each including fixed feature points among the four corners of the marker. The coordinate-conversion-parameter re-estimation determiner 21 determines that the coordinate conversion parameter candidates for the pair of fixed feature points when the distance D is minimized are coordinate conversion parameters. The coordinate-conversion-parameter re-estimation determiner 21 passes the determined coordinate conversion parameters to the coordinate converter 16.

As described above, the coordinate-conversion-parameter re-estimation determiner 21 determines the coordinate conversion parameters for, of the other three pairs of fixed feature points, the pair of fixed feature points when the error in the final result of the coordinate conversion is minimized. Thus, the coordinate converter 16 may enhance the accuracy of conversion of the three-dimensional coordinates of feature points from the camera coordinate system into the world coordinate system.

Additionally, according to this alternative modification, the three-dimensional position determiner 14 may calculate the three-dimensional coordinates in the camera coordinate system whose reference is the second place. In this case, letting (u, v) be coordinates in the second image of the natural feature points and the four corners of the marker in equation (2) noted above and letting (u', v') be coordinates in the first image of the natural feature points and the four corners of the marker, the three-dimensional position determiner 14 determines the three-dimensional coordinates of the natural feature points and the four corners of the marker in the camera coordinate system. In this case, in the three-dimensional coordinates in the camera coordinate system, the position of the image capture unit 3 at the second place is the origin.

A computer program for causing a computer to realize the functions of the control unit in the coordinate-conversion-parameter determination apparatus according to each of the above-described embodiments or modifications may be provided in the form of computer-readable media, for example, magnetic recording media, optical recording media, or semiconductor memories, in or on which the program is stored.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A coordinate-conversion-parameter determination apparatus comprising:
    an image capture circuit configured to generate a first image by photographing, at a first place, a marker that is placed in advance and whose position and shape are known and generate a second image by photographing, at a second place different from the first place, the marker;
    a memory; and
    one or more processors coupled to the memory, the one or more processors being configured to:
    detect feature points of the marker from each of the first image and the second image;
    calculate three-dimensional coordinates of each of the feature points of the marker in a camera coordinate system in which reference is the first place, based on a position of each feature point in the first image and a position of each feature point in the second image;
    calculate a coordinate conversion parameter so that a sum of absolute values of errors between three-dimensional coordinates in a world coordinate system, the three-dimensional coordinates in the world coordinate system being obtained by converting the three-dimensional coordinates of the feature points of the marker in the camera coordinate system by using the coordinate conversion parameter, and three-dimensional coordinates of feature points in the world coordinate system that correspond to the feature points of the marker in real space is minimized;
    convert the three-dimensional coordinates of each of the feature points of the marker in the camera coordinate system into the three-dimensional coordinates of the feature points in the world coordinate system using the calculated coordinate conversion parameter; and
    store, in the memory, the three-dimensional coordinates of the feature points in the world coordinate system in an initial map that is used to estimate at least one of a position and an orientation of the image capture circuit.

2. The coordinate-conversion-parameter determination apparatus according to claim 1, wherein the one or more processors are configured to:
    detect feature points other than the feature points of the marker from each of the first image and a third image different from the first image;
    convert, with respect to each of the feature points other than the feature points of the marker, the three-dimensional coordinates in the camera coordinate system that are calculated with the first place being a reference based on a position of each feature point in the first image and a position of each feature point in the third image into three-dimensional coordinates in the world coordinate system in accordance with the coordinate conversion parameter; and
    store, in the memory, the three-dimensional coordinates of the feature points other than the feature points of the marker in the world coordinate system.

3. The coordinate-conversion-parameter determination apparatus according to claim 1, wherein the one or more processors are configured to:
    create a plurality of pairs each including fixed feature points among the feature points of the marker, while changing a combination of the feature points;
    correct, with respect to each of the pairs of fixed feature points, the three-dimensional coordinates of the feature points of the marker in the camera coordinate system so that a sum of distances between the three-dimensional coordinates of the feature points other than the fixed feature points among the feature points of the marker in the camera coordinate system before the correction and three-dimensional coordinates of the feature points other than the fixed feature points in the camera coordinate system after the correction is minimized when positions of the feature points other than the fixed feature points are corrected so that a shape obtained by connecting the three-dimensional coordinates of the feature points of the marker in the camera coordinate system matches a shape obtained by connecting the feature points of the marker in the real space; and
    calculate the coordinate conversion parameter by using the corrected three-dimensional coordinates of the feature points of the marker in the camera coordinate system.

4. The coordinate-conversion-parameter determination apparatus according to claim 1, wherein the one or more processors are configured to:
    create a plurality of pairs each including fixed feature points among the feature points of the marker, while changing a combination of the feature points;
    correct, with respect to each of the pairs of fixed feature points, the three-dimensional coordinates of the feature points of the marker in the camera coordinate system by correcting positions of the feature points other than the fixed feature points among the feature points of the marker so that a shape obtained by connecting the three-dimensional coordinates of the feature points of the marker in the camera coordinate system matches a shape obtained by connecting the feature points of the marker in the real space; and determine that a coordinate conversion parameter candidate when a distance between a barycenter of the feature points of the marker in the world coordinate system and a barycenter of feature points, obtained by converting the three-dimensional coordinates of the feature points of the marker in the camera coordinate system that are corrected with respect to one of the pairs of fixed feature points into three-dimensional coordinates in the world coordinate system in accordance with the coordinate conversion parameter candidate, is minimized is the coordinate conversion parameter, the coordinate conversion parameter candidate being included in coordinate conversion parameter candidates calculated using the corrected three-dimensional coordinates of the feature points of the marker in the camera coordinate system with respect to the pairs of fixed feature points.

5. The coordinate-conversion-parameter determination apparatus according to claim 4, wherein, when the distance between the barycenter of the feature points of the marker in the world coordinate system and the barycenter of the feature points, obtained by converting the three-dimensional coordinates of the feature points of the marker in the camera coordinate system that are corrected with respect to one of the pairs of fixed feature points into the three-dimensional coordinates in the world coordinate system in accordance with the coordinate conversion parameter candidate calculated for the one of the pairs, is smaller than a predetermined permissible value, the one or more processors are configured to determine that the coordinate conversion parameter candidate for the one of the pairs is the coordinate conversion parameter, the one of the pairs being the pair with which a sum of distances between the three-dimensional coordinates in the camera coordinate system before the correction and the three-dimensional coordinates in the camera coordinate system after the correction is minimized.

6. The coordinate-conversion-parameter determination apparatus according to claim 1, wherein the marker is a square, and the feature points of the marker are four corners of the marker.

7. A coordinate-conversion-parameter determination method comprising:

generating a first image by photographing, at a first place, a marker that is placed in advance and whose position and shape are known and generating a second image by photographing, at a second place different from the first place, the marker;

detecting feature points of the marker from each of the first image and the second image;

calculating, with respect to each of the feature points of the marker, three-dimensional coordinates in a camera coordinate system whose reference is the first place, based on a position of each feature point in the first image and a position of each feature point in the second image;

calculating a coordinate conversion parameter so that a sum of absolute values of errors between three-dimensional coordinates in a world coordinate system, the three-dimensional coordinates being obtained by converting the three-dimensional coordinates of the feature points of the marker in the camera coordinate system by using the coordinate conversion parameter, and three-dimensional coordinates of feature points in a world coordinate system that correspond to the feature points of the marker in real space is minimized;

converting the three-dimensional coordinates of each of the feature points of the marker in the camera coordinate system into the three-dimensional coordinates of the feature points in the world coordinate system using the calculated coordinate conversion parameter; and storing, in a memory, the three-dimensional coordinates of the feature points in the world coordinate system in an initial map that is used to estimate at least one of a position and an orientation of an image capture circuit used to photograph the first and second images.

8. A non-transitory computer-readable recording medium having stored therein a program for causing a computer to execute a process for coordinate-conversion-parameter determination, the process comprising:

generating a first image by photographing, at a first place, a marker that is placed in advance and whose position and shape are known and generating a second image by photographing, at a second place different from the first place, the marker;

detecting feature points of the marker from each of the first image and the second image;

calculating, with respect to each of the feature points of the marker, three-dimensional coordinates in a camera coordinate system whose reference is the first place, based on a position of each feature point in the first image and a position of each feature point in the second image;

calculating a coordinate conversion parameter so that a sum of absolute values of errors between three-dimensional coordinates in a world coordinate system, the three-dimensional coordinates being obtained by converting the three-dimensional coordinates of the feature points of the marker in the camera coordinate system by using the coordinate conversion parameter, and three-dimensional coordinates of feature points in a world coordinate system that correspond to the feature points of the marker in real space is minimized;

converting the three-dimensional coordinates of each of the feature points of the marker in the camera coordinate system into the three-dimensional coordinates of the feature points in the world coordinate system using the calculated coordinate conversion parameter; and storing, in a memory, the three-dimensional coordinates of the feature points in the world coordinate system in an initial map that is used to estimate at least one of a position and an orientation of an image capture circuit used to photograph the first and second images.

* * * * *